United States Patent
Li et al.

(10) Patent No.: US 12,052,302 B2
(45) Date of Patent: Jul. 30, 2024

(54) DATA DISTRIBUTION METHOD AND NETWORK DEVICE

(71) Applicant: HUAWEI TECHNOLOGIES CO., LTD., Guangdong (CN)

(72) Inventors: Shizhen Li, Shenzhen (CN); Hua Tang, Shenzhen (CN); Jun Zhou, Nanjing (CN); Naiqiang Qiao, Nanjing (CN); Qi Bu, Nanjing (CN); Zhanyin Ma, Shenzhen (CN); Yali Jian, Shenzhen (CN); Zhiqiang Gao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 17/487,158

(22) Filed: Sep. 28, 2021

(65) Prior Publication Data

US 2022/0014574 A1    Jan. 13, 2022

Related U.S. Application Data

(63) Continuation of application No. PCT/CN2020/080038, filed on Mar. 18, 2020.

(30) Foreign Application Priority Data

Mar. 29, 2019  (CN) .......................... 201910249517.7

(51) Int. Cl.
*H04L 65/61* (2022.01)
*H04L 65/75* (2022.01)

(52) U.S. Cl.
CPC .............. *H04L 65/61* (2022.05); *H04L 65/75* (2022.05)

(58) Field of Classification Search
CPC ................................ H04L 65/61; H04L 65/75
See application file for complete search history.

(56) References Cited

U.S. PATENT DOCUMENTS 8,355,384 B2    1/2013  Agrawal et al.
10,348,851 B1 *  7/2019  Cheung .................. H04L 65/80
(Continued)

FOREIGN PATENT DOCUMENTS

CN           1345149 A     4/2002
CN         101222347 A     7/2008
(Continued)

OTHER PUBLICATIONS

International Search Report and Written Opinion issued in PCT/CN2020/080038, dated Jun. 18, 2020, 9 pages.
(Continued)

*Primary Examiner* — Andrew C Georgandellis

(57) ABSTRACT

This application provides a data distribution method includes: A network device buffers first data, where the first data is data of a service that is provided by a server for a first terminal device; the network device receives N first data requests sent by N second terminal devices; and when data requested by the N first data requests is data provided by the server based on the service, the network device intercepts the N first data requests and sends the buffered first data to the N second terminal devices. This can reduce a plurality of connections that are used to transmit data of a same service and that exist on a channel between the server and the network device, thereby occupying a smaller downlink bandwidth to transmit the data of the same service from the server to the network device.

10 Claims, 9 Drawing Sheets

(56) References Cited

U.S. PATENT DOCUMENTS

| | | | | |
|---|---|---|---|---|
| 2010/0268789 | A1* | 10/2010 | Yoo | H04L 67/566 709/214 |
| 2011/0083144 | A1* | 4/2011 | Bocharov | H04N 21/2183 725/32 |
| 2012/0044942 | A1* | 2/2012 | Yamaguchi | G06F 13/4022 370/400 |
| 2012/0110040 | A1 | 5/2012 | Prasad | |
| 2012/0226767 | A1 | 9/2012 | Luna et al. | |
| 2013/0086142 | A1 | 4/2013 | Hampel et al. | |
| 2014/0113653 | A1 | 4/2014 | Wendling et al. | |
| 2017/0054800 | A1* | 2/2017 | DiVincenzo | H04L 67/5681 |
| 2017/0336772 | A1* | 11/2017 | Plache | G05B 19/4183 |
| 2018/0054482 | A1* | 2/2018 | Ruiz | H04L 67/1004 |

FOREIGN PATENT DOCUMENTS

| | | |
|---|---|---|
| CN | 101361326 A | 2/2009 |
| CN | 103516731 A | 1/2014 |
| CN | 105052224 A | 11/2015 |
| CN | 105657570 A | 6/2016 |
| CN | 103139656 B | 12/2016 |
| CN | 106453451 A | 2/2017 |
| CN | 107241571 A | 10/2017 |
| CN | 108429805 A | 8/2018 |
| CN | 110113306 A | 8/2019 |
| WO | 2017117589 A1 | 7/2017 |

OTHER PUBLICATIONS

Office Action issued in CN201910249517.7, dated Mar. 1, 2021, 9 pages.

Office Action issued in CN201910249517.7, dated Sep. 16, 2021, 7 pages.

Notice of Allowance dated Mar. 10, 2022 issued in Chinese Application No. 201910249517.7 (4 pages).

Supplementary European Search Report dated Mar. 17, 2022 for European Application No. 20 78 2796 (3 pages).

Extended European Search Report dated Mar. 25, 2022 for European Application No. 20 782 796.5 (4 pages).

* cited by examiner

| t8 | t7 | t6 | t5 | t4 | t3 | t2 | t1 |

| 8 | 7 | 6 | 5 | 4 | 3 | 2 | 1 | Terminal device 101

| 8 | 7 | 6 | 5 | 4 | 3 | 2 | 1 | Terminal device 102

| 8 | 7 | 6 | 5 | 4 | 3 | 2 | 1 | Terminal device 103

| 8 | 7 | 6 | 5 | 4 | 3 | 2 | 1 | Terminal device 104

FIG. 3

DATA DISTRIBUTION METHOD AND NETWORK DEVICE

CROSS-REFERENCE TO RELATED APPLICATIONS

This is a continuation of International Application No. PCT/CN2020/080038, filed on Mar. 18, 2020, which claims priority to Chinese Patent Application No. 201910249517.7, filed on Mar. 29, 2019. The disclosures of the aforementioned applications are hereby incorporated by reference in their entireties.

TECHNICAL FIELD

This application relates to the field of information technologies, and more specifically, to a data distribution method and a network device.

BACKGROUND

With development of internet technologies, a network can provide an increasing quantity of services, for example, a video-live service, a video-on-demand service, an audio-live service, an audio-on-demand service, a network radio station, and a video download service. In addition, as user requirements increase, users have increasingly high requirements on quality of a service that can be provided by the network. For example, for a video service, a conventional standard-definition video cannot satisfy a user requirement, and a user prefers 1080P or even 2K and 4K videos.

With improvement of service quality, a size of data of a service is increasingly large, and a bandwidth occupied to transmit the data of the service is increasingly large. In addition to a multimedia service, a size of data such as an installation file of an application is also increasingly large. Therefore, a size of data corresponding to a data download service is also increasingly large.

If a plurality of terminal devices simultaneously request a same service from a server in the internet, the plurality of terminal devices need to separately establish a connection to the server to obtain data of the service that is sent by the server. The plurality of terminal devices may request the service from the server through a same network device. In other words, the data of the service that is sent by the server to the terminal devices first arrives at the network device, and then the network device forwards the data of the service to the corresponding terminal devices. When the plurality of terminal devices request a same service from the server through the network device, the server sends a plurality of pieces of same data to the network device, and then the network device separately forwards the received data to the corresponding terminal devices. In this case, a downlink (herein, "downlink" means a direction from the server to the network device) bandwidth is used to transmit the plurality of pieces of same data. Therefore, transmission of the data of the service that is requested by the plurality of terminal devices is mutually affected. A transmission speed of data requested by each terminal device on a downlink channel may be less than a data transmission speed generated when only one terminal device requests data from the server on the downlink channel. In addition, if another terminal device needs to request another service from the server through the network device, a downlink transmission speed of data of the service that is requested by the terminal device is also affected.

SUMMARY

This application provides a data distribution method and a network device, to occupy a smaller downlink bandwidth to transmit data of a same service from a server to a network device.

According to a first aspect, an embodiment of this application provides a data distribution method. The method includes: A network device buffers first data, where the first data is data of a service that is provided by a server for a first terminal device; the network device receives N first data requests sent by N second terminal devices, where N is a positive integer greater than or equal to 1; and when data requested by the N first data requests is data provided by the server based on the service, the network device intercepts the N first data requests and sends the buffered first data to the N second terminal devices.

It can be learned from the foregoing technical solution that the network device may buffer data of a service and send the buffered data of the service to another terminal device when the another terminal device requests a same service. This can reduce a plurality of connections that are used to transmit data of a same service and that exist on a channel between the server and the network device, thereby occupying a smaller downlink bandwidth to transmit the data of the same service from the server to the network device. In addition, terminal devices that request a same service may also obtain data of the requested service.

With reference to the first aspect, in a possible implementation of the first aspect, the method further includes: The network device receives second data when the first terminal device is disconnected from the server, where the second data is data provided by the server based on the service; the network device buffers the second data; and the network device sends the buffered second data to the N second terminal devices, where the second data is continuous with data received when the first terminal device is disconnected from the server.

That the second data is continuous with data (which is referred to as third data for short below for ease of description) received when the first terminal device is disconnected from the server means that the second data is data of the service that is provided by the server after the server provides the third data for the service. For example, if the second data corresponds to a time and the third data corresponds to a time, the time corresponding to the second data and the time corresponding to the third data are continuous, and the time corresponding to the second data is later than the time corresponding to the third data. For another example, if the first terminal device is not disconnected from the server, data of the service that the server continues to send after the server sends the third data is the second data.

According to the foregoing technical solution, when the first terminal device is disconnected, the network device may still continue to obtain data of the service that is provided by the server, and continue to send the obtained data to a terminal device. In addition, the server provides continuous data before and after the first terminal device is disconnected. This can prevent transmission of the data of the service from being interrupted, thereby preventing service experience of the terminal device from being affected. For example, a frame loss, frame freezing, and a data loss do not occur.

With reference to the first aspect, in a possible implementation of the first aspect, the second data is data of the service that is provided by the server for $N_1$ second terminal devices in the N second terminal devices, where $N_1$ is a positive integer greater than or equal to 1 and less than N; or the second data is data of the service that is provided by the server for M third terminal devices, where M is a positive integer greater than or equal to 1.

According to the foregoing technical solution, when the first terminal device is disconnected, the network device may still continue to request to obtain data of the service from the server through a third terminal device (that is, a terminal device that requests data of a same service as the second terminal device from the server) or some second terminal devices.

With reference to the first aspect, in a possible implementation of the first aspect, before the network device receives the second data, the method further includes: The network device receives N second data requests sent by the N second terminal devices, where data requested by the N second data requests is data provided by the server based on the service, and the data requested by the N pieces of second data is different from the data requested by the N first data requests; and when the first terminal device is disconnected from the server, the network device sends $N_1$ second data requests in the N second data requests to the server, and intercepts $N_2$ second data requests in the N second data requests other than the $N_1$ second data requests. The $N_1$ second data requests are sent by the $N_1$ second terminal devices.

According to the foregoing technical solution, the network device may select to release interception for data requests sent by some second terminal devices, so as to request to obtain data of the service from the server through the some second terminal devices.

With reference to the first aspect, in a possible implementation of the first aspect, each of the N second data requests corresponds to a time, the time corresponding to each of the N second data requests is not later than a reference time, a difference between a time corresponding to each of the $N_1$ second data requests and the reference time is less than a preset threshold, and the reference time is a time corresponding to a last data request that is received by the network device from the first terminal device to request to obtain data of the service.

According to the foregoing technical solution, a data request corresponding to a time closet is selected as much as possible as a data request for continuing to request to obtain data of the service from the server. This can reduce as much as possible obtaining of data that is the same as the first data, thereby occupying a smaller downlink bandwidth to transmit same data.

With reference to the first aspect, in a possible implementation of the first aspect, $N_1$ is equal to 1, each of the N second data requests corresponds to a time, the time corresponding to each of the N second data requests is not later than a reference time, a difference between a time corresponding to the $N_1$ second data request and the reference time is smallest for a difference between the time corresponding to each of the N second data requests and the reference time, and the reference time is a time corresponding to a last data request that is received by the network device from the first terminal device to request to obtain data of the service.

According to the foregoing technical solution, a data request closest to the reference time is selected as much as possible as a data request for continuing to request to obtain the service from the server. This can reduce as much as possible obtaining of data that is the same as the first data, thereby occupying a smaller downlink bandwidth to transmit same data.

With reference to the first aspect, in a possible implementation of the first aspect, before the network device receives the second data, the method further includes: The network device receives M third data requests sent by the M third terminal devices; and the network device sends the M third data requests to the server when data requested by the M third data requests is data provided by the server based on the service.

According to the foregoing technical solution, the network device may release a data request sent by a terminal device that requests data of a same service as the second terminal device from the server. In other words, when receiving data requests sent by a plurality of terminal devices, the network device may intercept data requests sent by only some terminal devices (that is, the N second terminal devices), and does not intercept data requests sent by remaining terminal devices (that is, the M third terminal devices). In this way, data of the service that is provided by the server may be obtained by using a data request that is sent by a terminal device and that is not intercepted.

With reference to the first aspect, in a possible implementation of the first aspect, that a network device buffers first data includes: The network device buffers the first data when data of the service is not buffered.

According to the foregoing technical solution, the network device may start to buffer data of the service only when the data of the service is not buffered. In other words, if the network device has buffered the data of the service, the network device may not need to buffer the data of the service. In this way, same data can occupy less buffer space of the network device.

With reference to the first aspect, in a possible implementation of the first aspect, when the first service is a video service, the first data can constitute at least one group of pictures GOP.

One GOP includes one key frame. The key frame includes key data used for video decoding. Therefore, according to the foregoing technical solution, when receiving the first data, a terminal device can correctly decode video data corresponding to the first data.

With reference to the first aspect, in a possible implementation of the first aspect, when the first service is a real-time data service, the network device determines to buffer the first data by using a first storage medium; or when the first service is a non-real-time data service, the network device determines to buffer the first data by using a second storage medium, where an access speed of the first storage medium is greater than an access speed of the second storage medium.

According to the foregoing technical solution, a storage medium with a high access speed is used to store a real-time data service, so that a requirement of the real-time data service on real-time performance can be better ensured.

With reference to the first aspect, in a possible implementation of the first aspect, if the service is a non-integrity data service, when the network device buffers data of the service, the network device intercepts the N first data requests sent by the N terminal devices. If the service is an integrity data service, when determining that data of the service is buffered and all data of the service can be provided, the network device intercepts the N first data requests sent by the N second terminal devices. When determining that all the data of the service is buffered, the network device may determine that all the data of the service can be provided; or when determining that the buffered data of the service includes all data of the service buffered before the N first data requests are received (in other words, the network device has not deleted the data of the service), the network device may determine that all the data of the service can be provided.

According to the foregoing technical solution, the N second terminal devices can obtain all data that needs to be obtained, thereby avoiding a data loss.

With reference to the first aspect, in a possible implementation of the first aspect, the network device receives content of information from a terminal device; and determines, based on the content of the information, to transparently transmit or intercept the information. Intercepting the information may be directly deleting the information or deleting the information after the information is stored for a period of time.

According to a second aspect, an embodiment of this application provides a network device. The network device includes modules configured to perform any one of the first aspect and the possible implementations of the first aspect.

According to a third aspect, an embodiment of this application provides a network device. The network device includes a memory, a processor, and a transceiver. The memory is configured to store instructions, and the processor is configured to implement any one of the first aspect and the possible implementations of the first aspect in combination with the transceiver based on the instructions stored in the memory.

According to a fourth aspect, an embodiment of this application provides a storage medium. The storage medium stores instructions used to implement the method according to any one of the first aspect and the possible implementations of the first aspect.

According to a fifth aspect, this application provides a computer program product including instructions. When the computer program product is run on a computer, the computer is enabled to perform the method according to any one of the first aspect and the possible implementations of the first aspect.

BRIEF DESCRIPTION OF DRAWINGS

FIG. 3 is a schematic diagram in which a network device 110 receives data requests sent by different terminal devices;

DESCRIPTION OF EMBODIMENTS

Figure 1:
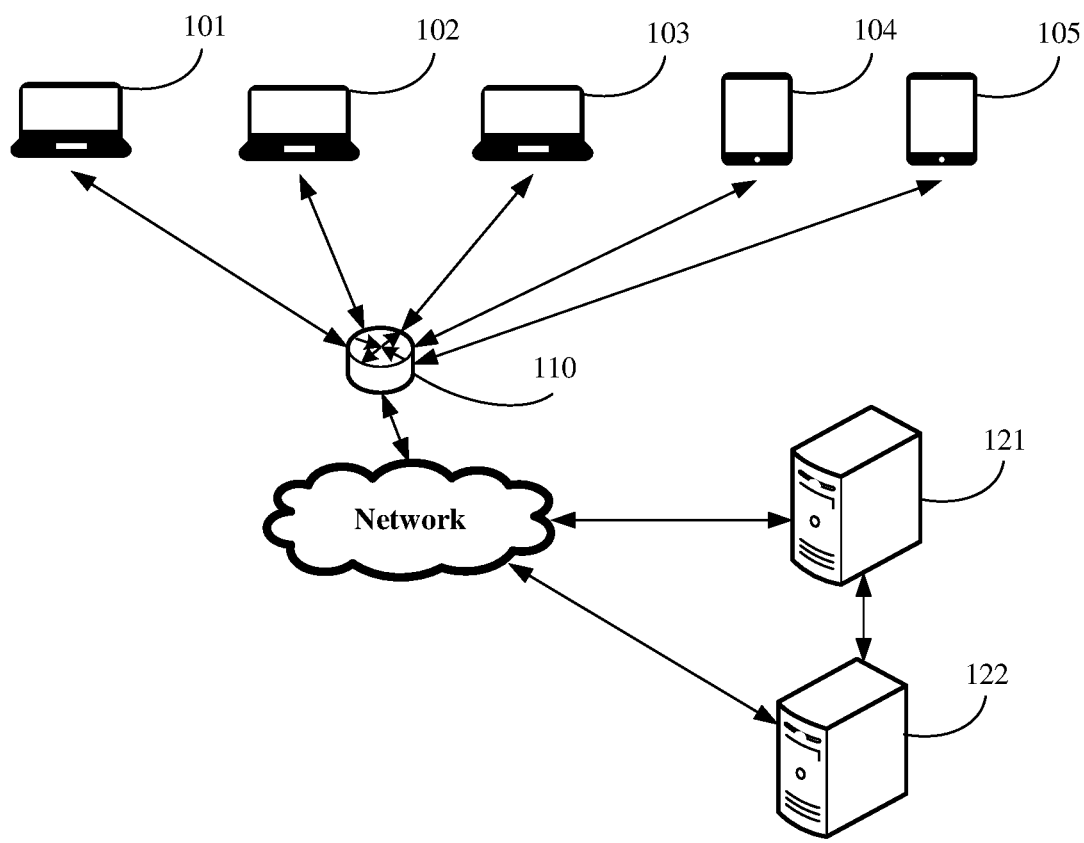
FIG. 1 is a schematic structural diagram of a system to which a data distribution method provided in this application can be applied.

The following describes the technical solutions in this application with reference to the accompanying drawings.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. In addition, "at least one of the following items (pieces)" or a similar expression thereof means any combination of these items, including a single item (piece) or any combination of a plurality of items (pieces). For example, at least one of a, b, or c may indicate: a, b, c, a and b, a and c, b and c, or a, b, and c, where a, b, and c may be singular or plural. In addition, in the embodiments of this application, terms such as "first" and "second" do not limit a quantity or an execution sequence.

It should be noted that, in this application, the term such as "example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

A terminal device in the embodiments of this application may be a computer device, for example, a personal computer, a notebook computer, a tablet computer, or a smartphone, that requests to obtain data in a server.

A network device in the embodiments of this application may be a network device in a local area network, or may be a network device in a metropolitan area network, a wide area network, or the internet. The network device may be an existing network device, for example, may be a device such as an access router (AR) or a backbone router, or may be a dedicated device configured to perform a method provided in the embodiments of this application, or a server that can be configured to perform the method provided in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system layer may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic structural diagram of a system to which a data distribution method provided in this application can be applied. The system shown in FIG. 1 includes a terminal device 101, a terminal device 102, a terminal device 103, a terminal device 104, and a terminal device 105. The system further includes a network device 110, a server 121, and a server 122.

Optionally, in some embodiments, the terminal device 101, the terminal device 102, the terminal device 103, the terminal device 104, and the terminal device 105 shown in FIG. 1 may be terminal devices in a same local area network.

Optionally, in some other embodiments, the terminal device 101, the terminal device 102, the terminal device 103, the terminal device 104, and the terminal device 105 may be terminal devices in different local area networks.

Optionally, in some embodiments, when the terminal device 101 to the terminal device 105 are terminal devices in a same local area network, the network device 110 may be a network device in the local area network.

Optionally, in some other embodiments, when the terminal device 101 to the terminal device 105 are terminal devices in a same local area network, the network device 110 may be a network device that does not belong to the local area network, for example, may be a network device in a wide area network, a metropolitan area network, or the internet.

The terminal device 101 to the terminal device 105 may request, through the network device 110, the server 121 to provide a business service.

Optionally, in some embodiments, the server 121 stores data of a service requested by a terminal device. In this case, the server 121 may directly send the data of the service requested by the terminal device to the terminal device.

Optionally, in some other embodiments, the server 121 may send the data of the service requested by the terminal device to the terminal device through another server. For example, the server 121 may have a plurality of mirror servers, and the server 122 is one of the plurality of mirror servers. The server 121 may indicate the server 122 to send the data of the service requested by the terminal device to the terminal device. For another example, the server 121 may not store the data of the service requested by the terminal device, but the server 122 stores the data of the service requested by the terminal device. In this case, the server 121 may indicate the server 122 to send the data of the service requested by the terminal device to the terminal device.

Optionally, in some embodiments, when the terminal device 101 to the terminal device 105 are terminal devices in a same local area network, the server 121 and the server 122 are servers located outside the local area network.

With reference to the system shown in FIG. 1, the following describes in detail data distribution methods provided in the embodiments of this application. It can be understood that the system shown in FIG. 1 is merely intended to help a person skilled in the art better understand the technical solutions of this application, but is not intended to limit the technical solutions of this application.

Figure 2A:
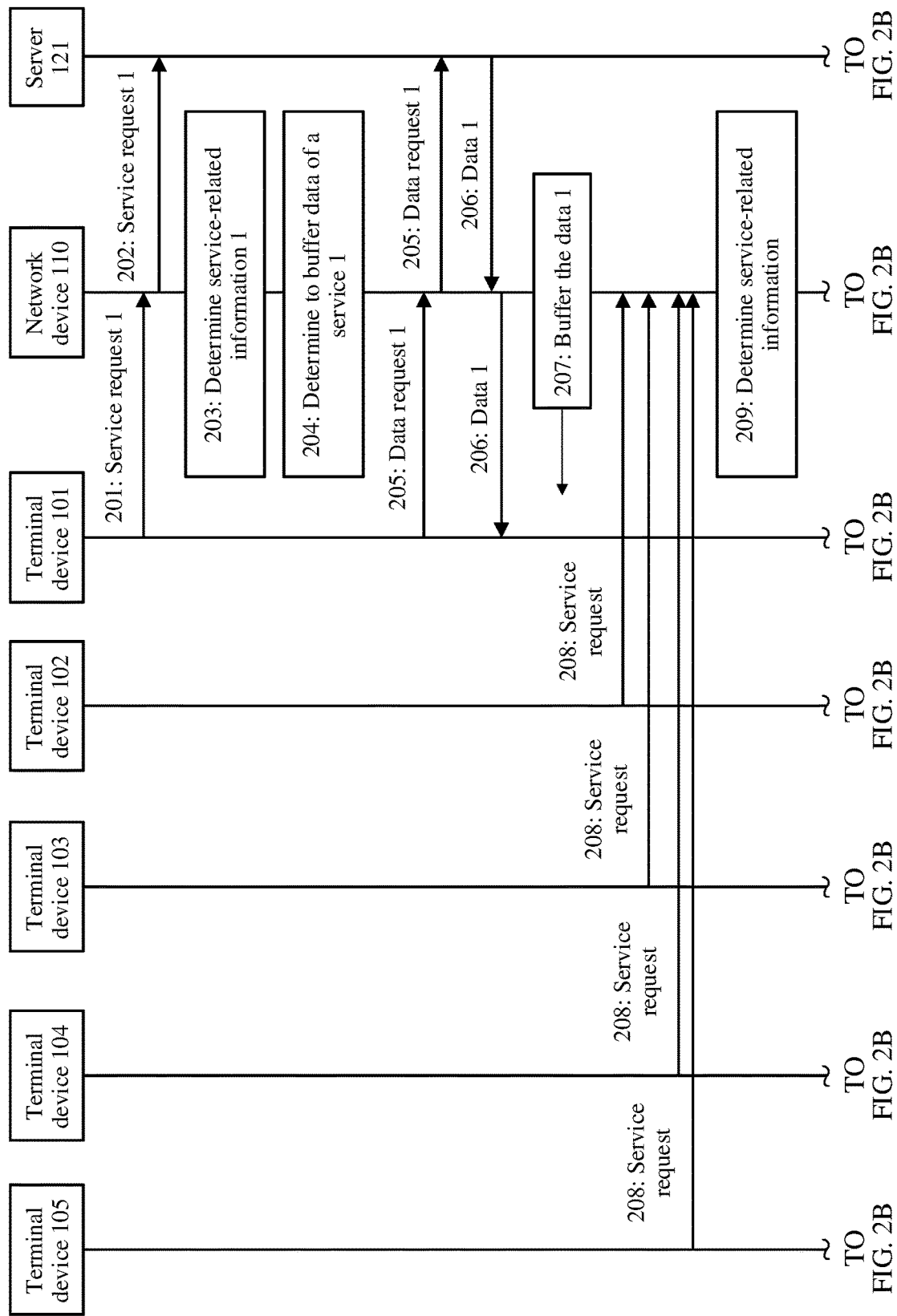
FIG. 2A and FIG. 2B are a schematic flowchart of a data distribution method according to an embodiment of this application.
Figure 2B:
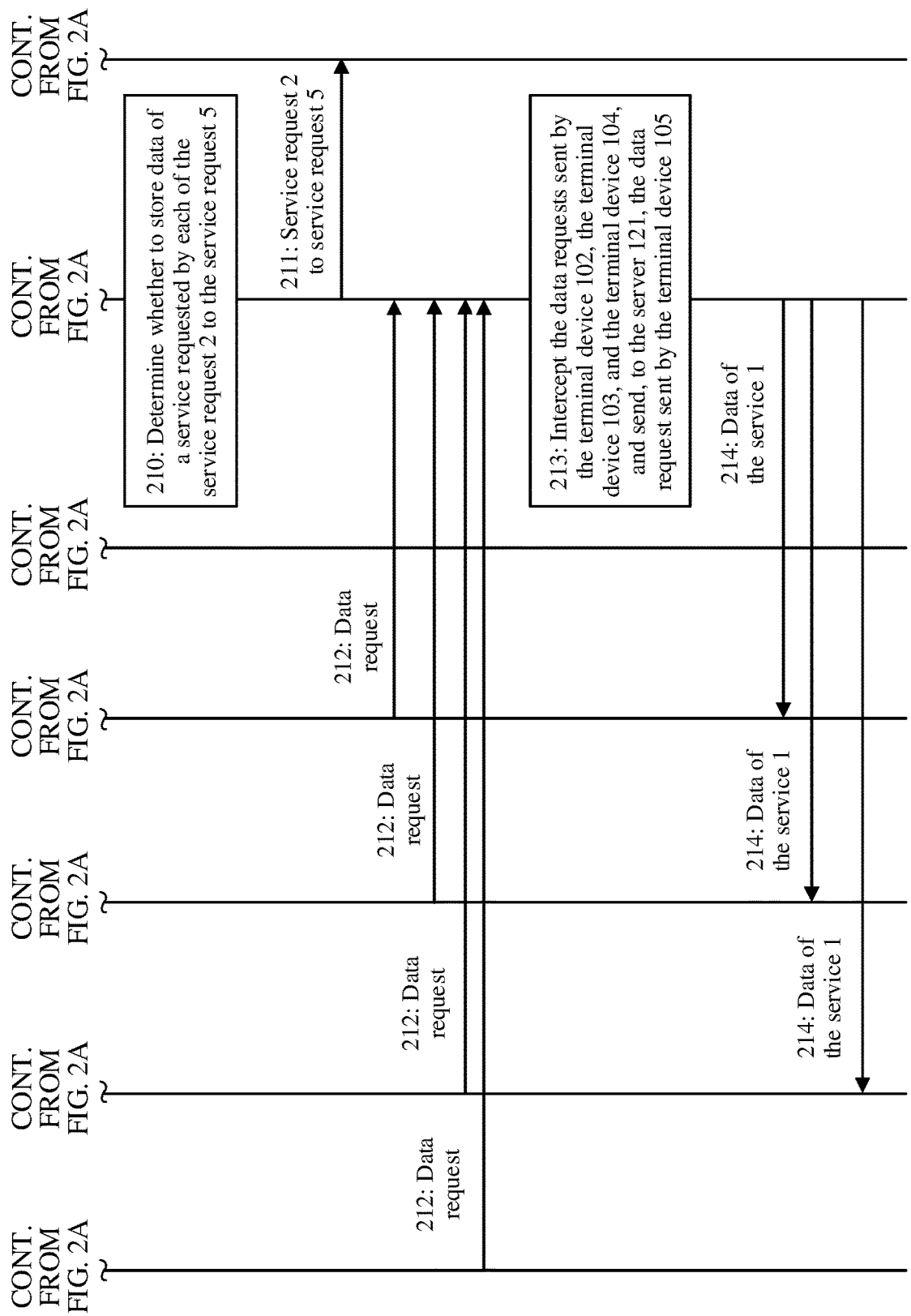

FIG. 2A and FIG. 2B are a schematic flowchart of a data distribution method according to an embodiment of this application.

201: A terminal device 101 sends a service request 1 to a network device 110, where the service request 1 is used to request a service 1 from a server 121.

When receiving the service request 1, the network device 110 may first determine whether data of the service 1 is buffered. For ease of description, it is assumed that the network device 110 does not buffer the data of the service 1 when receiving the service request 1. For a specific implementation in which the network device 110 determines whether data of a service requested by a received service request is buffered, refer to descriptions of the following steps.

202: The network device 110 sends the received service request 1 to the server 121.

A specific form of the service 1 is not limited in this embodiment of this application. For example, in some embodiments, the service 1 may be a media play service. The media play service may be a real-time media play service (for example, a video-live service or an audio-live service), or may be a non-real-time media play service (for example, a service of playing a video or audio by a user on demand) For another example, in some other embodiments, the service 1 may be a download service, such as a service of downloading an installation file, a video file, or an audio file of an application.

The service request 1 is used as an example. After receiving the service request 1 sent by the terminal device 101, the server 121 determines an object of the service 1 requested by the service request 1. For example, if the service 1 is a media play service, the object of the service 1 may be streaming media (which may also be referred to as a media stream such as a video stream or an audio stream). If the service 1 is a download service, the object of the service 1 is a file that the service 1 requests to download, for example, an installation file, a video file, or an audio file of an application. Generally, the object of the service 1 cannot be carried in only one data packet. Therefore, the server 121 sends the object of the service 1 to the terminal device 101 by using a plurality of data packets. In this embodiment of this application, data of a service or data provided based on a service is data of an object that belongs to the service or data of an object that constitutes the service.

According to different services or different protocols corresponding to services, the service request 1 may be carried in one or more messages. In other words, in some embodiments, the terminal device 101 may send the service request 1 to the server 121 by using one message. In some other embodiments, the terminal device 101 may send the service request 1 to the server 121 by using a plurality of messages.

A real-time messaging protocol (RTMP) is used as an example. The service request 1 may be carried in a connection message.

By performing step 201 and step 202, the terminal device 101 may request the service 1 from the server 121 through the network device 110.

Optionally, in some embodiments, before requesting the service 1 from the server 121 through the network device 110, the terminal device 101 may first establish a connection to the network device 110. The connection established between the terminal device 101 and the network device 110 may be a transmission control protocol (TCP) connection, a user datagram protocol (UDP) connection, or the like. A specific connection established between the terminal device 101 and the network device 110 is not limited in this embodiment of this application, provided that the terminal device 101 can send information to the network device 110 through the established connection, and receive, through the established connection, information sent by the network device 110. For example, through the established connection, the terminal device 101 may send the service request 1 to the network device 110 and receive the data of the service 1 that is sent by the network device 110.

Optionally, in some embodiments, before requesting the service 1 from the server 121, the terminal device 101 may first establish a connection to the server 121. The terminal device 101 may establish the connection to the server 121 through the network device 110. The network device 110 may transparently transmit information involved in a process of establishing a connection between the terminal device 101 and the server 121. The connection established between the terminal device 101 and the server 121 may be a TCP connection, a UDP connection, or the like. The connection between the terminal device 101 and the server 121 is similar to the connection between the terminal 101 and the network device 110. A specific connection established between the terminal device 101 and the server 121 is not limited in this embodiment of this application, provided that the terminal device 101 can send information to the server 121 through the established connection, and receive, through the established connection, information sent by the server 121. For example, through the established connection, the terminal device 101 may send the service request 1 to the server 121 and receive the data of the service 1 that is sent by the server 121.

A TCP connection establishment process is used as an example below to briefly describe an implementation in which the network device 110 transparently transmits information involved in the connection establishment process. Three pieces of information are involved in total when the terminal device 101 establishes the TCP connection to the server 121: synchronization request information sent by the terminal device 101, synchronization acknowledgment information sent by the server 121 to reply to the synchronization request information, and acknowledgment information sent by the terminal device 101 to reply to the synchronization acknowledgment information. For specific content of the synchronization request information, the synchronization acknowledgment information, and the acknowledgment information, refer to the TCP protocol. Details are not described herein again. The terminal device 101 sends the synchronization request information to the network device 110. The network device 110 forwards the received synchronization request information to the server 121. After receiving the synchronization request information, the server 121 determines the synchronization acknowledgment information corresponding to the synchronization request information, and sends the synchronization acknowledgment information to the network device 110. The network device 110 may forward the received synchronization acknowledgment information to the terminal device 101. After receiving the synchronization acknowledgment information, the terminal device 101 determines the acknowledgment information corresponding to the synchronization acknowledgment information, and sends the acknowledgment information to the network device 110. The network device 110 may forward the received acknowledgment information to the server 121. In this way, the TCP connection is established between the terminal device 101 and the server 121.

Optionally, in some embodiments, after establishing the connection to the server 121, the terminal device 101 may directly request the service 1.

Optionally, in some other embodiments, after the terminal device 101 establishes the connection to the server 121, the server 121 further needs to verify that the terminal device 101 is an authorized device. For example, the terminal device 101 may send, to the server 121, a user name and a password that are used for login. The server 121 verifies, based on the received user name and password, whether the terminal device 101 is an authorized device. If determining that the terminal device 101 is an authorized device, the server 121 may send verification success information to the terminal device 101; or if determining that the terminal device 101 is an unauthorized device, the server 121 may send verification failure information to the terminal device 101. It can be understood that the user name and the password that are sent by the terminal device 101 to the server 121 are sent to the server 121 through the network device 110. Correspondingly, the verification success/verification failure information sent by the server 121 to the terminal device 101 is also sent to the terminal device 101 through the network device 110.

Optionally, in some embodiments, after receiving the service request 1, the server 121 may send a service request feedback to the terminal device 101. Optionally, in some embodiments, the network device 110 may store the service request feedback.

203: The network device 110 determines, based on the service request 1, service-related information corresponding to the service request 1. For ease of description, the service-related information corresponding to the service request 1 is referred to as service-related information 1 below.

Optionally, in some embodiments, the service-related information 1 may include identity information of the object of the service 1. The identity information of the object of the service may be obtained from the service request 1. In other words, the service request 1 may include the identity information of the object of the service 1. For ease of description, the identity information of the object of the service 1 may be referred to as identity information 1 for short below.

The RTMP is used as an example. The service request 1 sent by the terminal device 101 may be a connect message. For ease of description, the connect message that is sent by the terminal device 101 to request the service 1 may be referred to as a connect message 1. The service 1 requested by the terminal device 101 may be a video-live service. Different video-live channels correspond to different channel names. Therefore, when requesting a video-live service, the terminal device 101 needs to send a channel name of the requested video-live service to the server 121. In this way, the server 121 may send data of a corresponding video-live service channel to the terminal device 101. The channel name of the video-live service that the terminal device 101 requests to obtain may be carried in the connect message 1. In other words, the connect message 1 may include the channel name of the video-live service requested by the terminal device 101. For ease of description, the channel name carried in the connect message 1 is referred to as a channel name 1 below. In conclusion, the terminal device 101 may request a video-live service from the network device 121 by using the connect message 1. The video-live service is a video-live service whose channel name is the channel name 1. The object of the service requested by the terminal device 101 is a video-live stream of the channel name 1, and the channel name 1 is the identity information of the object of the service 1 requested by the terminal device 101.

The download service is used as an example. The service request 1 sent by the terminal device 101 may include a file name of a file that needs to be downloaded. The file name is the identity information of the object of the service requested by the terminal device 101.

Optionally, in some other embodiments, in addition to the identity information of the object of the service, the service-related information may further include identity information of a server that provides the service. In this case, the service-related information 1 that is determined by the network device 110 and that corresponds to the service 1 may further include identity information of the server 121. Optionally, in some embodiments, the identity information of the server 121 may be an internet protocol (IP) address of the server 121. Optionally, in some embodiments, the network device 110 may obtain the IP address of the server 121 based on a data packet sent in the process of establishing a connection between the terminal device 101 and the server 121. Optionally, in some other embodiments, the service request 1 may carry a domain name of the server 121, and the network device 110 may determine the IP address of the server 121 based on the domain name of the server 121. Optionally, in some other embodiments, the identity information of the server 121 may be the domain name of the server 121.

Optionally, in some embodiments, the service-related information 1 may further include identity information of the terminal device 101. Optionally, in some embodiments, the identity information of the terminal device 101 may be an IP address of the terminal device 101. The network device 110 may obtain the IP address of the terminal device 101 in a process of establishing a connection to the terminal device 101. Optionally, in some other embodiments, the identity information of the terminal device 101 may alternatively be a user name used by the terminal device 101 to log in to the server 121.

For example, Table 1 shows one piece of service-related information corresponding to the service 1.

TABLE 1

| Channel name | Server identity information |
|---|---|
| CCTV 1 | 182.1.23.152 |

The service-related information 1 shown in Table 1 includes one channel name and an IP address of one server.

Optionally, in some embodiments, the network device 110 may buffer data corresponding to any service requested, from any server, by any terminal device that passes through the network device 110. In this case, the network device 110 can determine corresponding service-related information provided that the network device 110 receives a service request sent by the terminal device. In other words, in this case, the network device 110 does not need to determine, before determining the service-related information, that the data of the service 1 needs to be buffered (in other words, does not need to perform step 204 before step 203).

Optionally, in some embodiments, the method shown in FIG. 2A and FIG. 2B may further include step 204.

204: The network device 110 determines that the data of the service 1 needs to be buffered.

Optionally, in some embodiments, step 204 may be performed before step 203. In other words, only when determining that the data of the service 1 needs to be buffered, the network device 110 needs to determine the service-related information 1 corresponding to the service request 1, and perform a subsequent step. If the network device determines that the data of the service 1 does not need to be buffered, the network device may process the data of the service 1 in an existing manner of processing data from a server.

Optionally, in some embodiments, the network device 110 may determine, based on preset server information and the identity information of the server 121, whether the data of the service 1 needs to be buffered.

For example, in some embodiments, the preset server information may be a server whitelist. Specifically, the network device 110 may store a server whitelist, and the server whitelist includes identity information of one or more servers. If a service requested by the terminal device 101 is provided by a server in the server whitelist, it is determined that data of the service needs to be buffered; or if a service requested by the terminal device 101 is not provided by a server in the server whitelist, it is determined that data of the service does not need to be buffered. The server 121 and the data 1 are used as an example. If determining that the server whitelist includes the identity information of the server 121, the network device 110 determines that the data of the service 1 needs to be buffered; or if determining that the server whitelist does not include the identity information of the server 121, the network device 110 determines that the data of the service 1 does not need to be buffered. The identity information of the server in the server whitelist may be an IP address of the server, or may be a domain name of the server. The server whitelist may be set in the network device 110 when the network device 110 is delivered from a factory, or may be set by the user and stored in the network device 110.

For another example, in some embodiments, the preset server information may be a server blacklist. Specifically, the network device 110 may store a server blacklist, and the server blacklist includes identity information of one or more servers. If a service requested by the terminal device 101 is provided by a server in the server blacklist, it is determined that data of the service does not need to be buffered; or if a service requested by the terminal device 101 is not provided by a server in the server blacklist, it is determined that data of the service needs to be buffered. The server 121 and the data 1 are still used as an example. If determining that the server blacklist does not include the identity information of the server 121, the network device 110 determines that the data of the service 1 needs to be buffered; or if determining that the server blacklist includes the identity information of the server 121, the network device determines that the data of the service 1 does not need to be buffered. The server blacklist is similar to the server whitelist. The identity information of the server in the server whitelist may be an IP address of the server, or may be a domain name of the server. The server blacklist may be set in the network device 110 when the network device 110 is delivered from a factory, or may be set by the user and stored in the network device 110.

For ease of description, a determining manner of determining, based on the preset server information, whether the data 1 needs to be buffered is referred to as a first determining rule below.

Optionally, in some other embodiments, the network device 110 may alternatively determine, based on a preset service type and a service type of the service 1, whether the data 1 needs to be buffered.

For example, in some embodiments, the preset service type may be a service type whitelist, and the service type whitelist includes one or more service types. If a service type of a service requested by the terminal device 101 is a service type in the service type whitelist, it is determined that data of the service needs to be buffered; or if a service type of a service that the terminal device 101 requests to obtain is not a service type in the service type whitelist, it is determined that data of the service does not need to be buffered. The service 1 is used as an example. If determining that the service type whitelist includes the service type of the service 1, the network device 110 determines that the data of the service 1 needs to be buffered; or if determining that the service type whitelist does not include the service type of the service 1, the network device 110 determines that the data of the service 1 does not need to be buffered. The service type whitelist may be set in the network device 110 when the network device 110 is delivered from a factory, or may be set by the user and stored in the network device 110.

For another example, in some embodiments, the preset service type may be a service type blacklist, and the service type blacklist includes one or more service types. If a service type of a service that the terminal device 101 requests to obtain is a service type in the service type blacklist, it is determined that data of the service does not need to be buffered; or if a service type of a service that the terminal device 101 requests to obtain is not a service type in the service type blacklist, it is determined that data of the service needs to be buffered. The service 1 is used as an example. If determining that the service type blacklist does not include the service type of the service 1, the network device 110 determines that the data of the service 1 needs to be buffered; or if determining that the service type blacklist includes the service type of the service 1, the network device 110 determines that the data of the service 1 does not need to be buffered. The service type blacklist may be set in the network device 110 when the network device 110 is delivered from a factory, or may be set by the user and stored in the network device 110.

For ease of description, a determining manner of determining, based on the preset service type information, whether the data 1 needs to be buffered is referred to as a second determining rule below.

Optionally, in some other embodiments, the network device 110 may alternatively determine, based on a total size of data corresponding to the service 1, whether the data 1 needs to be buffered.

After the server 121 obtains the service request 1, the server 121 may send the total size of the data that the service 1 requests to obtain to the network device 110, and the network device 110 forwards the total size of the data to the terminal device 101. After receiving the total size of the data that the service 1 requests to obtain, the network device 110 may determine, based on the total size of the data that the service 1 requests to obtain, whether to buffer the data 1. It can be learned that, in this case, step 204 is performed after step 203.

Specifically, if determining that the total size of the data that the service 1 requests to obtain is greater than or equal to a preset data size threshold, the network device 110 determines to buffer the data of the service 1; or if determining that the total size of the data that the service 1 requests to obtain is less than the preset data size threshold, the network device 110 determines that the data of the service 1 does not need to be buffered. Optionally, if determining that the data 1 of the service 1 does not need to be buffered, the network device 110 may delete the service-related information that is determined in step 203 and that corresponds to the data 1.

For ease of description, a determining manner of determining, based on the total size of the data that the service 1 requests to obtain, whether to buffer the data 1 is referred to as a third determining rule below.

Optionally, in some other embodiments, the network device 110 may alternatively determine, based on an available space size of a storage apparatus configured to buffer data, whether to buffer the data of the service 1. Available space of the storage apparatus is storage space used to buffer data from a server. If the available space size of the storage apparatus is greater than or equal to a preset storage space size, it may be determined that the data of the service 1 is to be buffered; or if the available space size of the storage apparatus is less than the preset storage space size, it is determined that the data 1 of the service 1 is not to be buffered.

For ease of description, a determining manner of determining, based on the available space size of the storage apparatus, whether to buffer the data of the service 1 is referred to as a fourth determining rule below.

Optionally, in some other embodiments, the network device 110 may alternatively determine, based on an available downlink bandwidth, whether to buffer the data of the service 1. The available downlink bandwidth is a bandwidth that can be used by the network device 110 for data from a downlink direction. The downlink direction is a direction from the server 121 or another server to the network device 110. An uplink direction corresponding to the downlink direction is a direction from the terminal device 101 or another terminal device (for example, the terminal device 102 or the terminal device 103) to the network device 110. If the available downlink bandwidth is less than a preset available downlink bandwidth, it may be determined that the data of the service 1 is to be buffered; or if the available downlink bandwidth is greater than or equal to the preset available downlink bandwidth, it is determined that the data of the service 1 is not to be buffered. When the data of the service 1 is buffered, if another terminal device also requests the service 1 from the server 121, the network device 110 may directly send the buffered data of the service 1 to the another terminal device. In this way, a smaller downlink bandwidth is occupied to transmit same data in a case of a relatively small available downlink bandwidth.

For ease of description, a determining manner of determining, based on the available downlink bandwidth of the storage apparatus, whether to buffer the data of the service 1 is referred to as a fifth determining rule below.

Optionally, in some other embodiments, the network device 110 may alternatively determine, based on a quantity of terminal devices that simultaneously request the service 1, whether to buffer the service 1. If the quantity of terminal devices that simultaneously request the service 1 is greater than or equal to a preset quantity, it may be determined that the service 1 is to be buffered; or if the quantity of terminal devices that simultaneously request the service 1 is less than the preset quantity, it is determined that the service 1 is not to be buffered. It can be understood that "simultaneously request" herein may mean that request time points are close. For example, if the network device 110 receives, within a preset time range, service request messages that are sent by S terminal devices to request the service 1, the network device 110 may determine that the S terminal devices are terminal devices that simultaneously request the service 1, where S is a positive integer greater than or equal to 2.

For ease of description, a determining manner of determining, based on the quantity of terminal devices that simultaneously request the service 1, whether to buffer the data of the service 1 is referred to as a sixth determining rule below.

Optionally, in some embodiments, the network device 110 may determine, according to any one or more of the first determining rule to the sixth determining rule, whether to buffer the data 1.

Optionally, in some embodiments, if the network device 110 determines, based on any one or more of the fourth determining rule, the fifth determining rule, and the sixth determining rule, whether the data of the service 1 needs to be buffered, the network device 110 may perform the determining step before step 203, or may perform the determining step after step 203. If performing the determining step after step 203, the network device 110 may first determine the service-related information 1. If the network device determines that the data 1 does not need to be buffered, the network device 110 may delete the determined service-related information 1.

205: The terminal device 101 sends a data request 1 to the network device 110, and the network device 110 sends the data request 1 to the server 121, where the data request 1 is used to request data of the first service. For ease of description, the data of the first service that is requested by the data request 1 is referred to as data 1 below.

The data request 1 may be a group of requests used to request to obtain the data of the service 1 from the server. The data request 1 may be carried in one or more messages.

The RTMP is used as an example. The terminal device 101 may receive a service request feedback sent by the server 121, where the service request feedback may be a result for connect message. When receiving the result for connect message, the terminal device 101 may send the data request 1 to the server 121, to request to obtain the data of the service 1 from the server 121. The data request may include a create stream message, a set buffer length (set buf len) message, and a play message.

Optionally, in some embodiments, a server may send a data request feedback corresponding to a data request to a terminal device. In other words, the server 121 may send a data request feedback 1 corresponding to the data request 1 to the terminal device 101.

Similar to the data request 1, the data request feedback 1 may be a group of feedback information sent by the server 121 to the terminal device 101 for feedback for the data request 1. The data request feedback 1 may also be carried in one or more messages.

The RTMP is still used as an example. The data request feedback 1 sent by the server 121 may include a result for create stream message and a stream begin message.

206: The network device 110 receives the data 1 sent by the server 121, and sends the data 1 to the terminal device 101.

The data 1 may be partial data of the object of the service 1. The data 1 may include one or more data packets. The server 121 may send a data packet in the data 1 to the network device 110, and then the network device 110 sends the received data packet to the terminal device 101 that requests the data 1.

Optionally, in some embodiments, the server 121 that receives the service request 1 sent by the terminal device 101 may directly send the data of the service 1 to the network device 110. In some other embodiments, the server 121 may indicate the server 122 to send the data corresponding to the service 1 to the network device 110. For ease of description, in the embodiment shown in FIG. 2A and FIG. 2B, it is assumed that a server that sends the data corresponding to the service 1 is the server 121.

207: The network device 110 buffers the received data 1.

Optionally, in some embodiments, if the service 1 is a streaming media service, the data 1 buffered by the network device 110 may constitute T groups of pictures (GOP), where T is a positive integer greater than or equal to 1. One GOP may include a plurality of data packets. A quantity of data packets in one GOP is related to a streaming media encoding scheme. If two streaming media are differently encoded, the two streaming media may include different quantities of data packets for GOPs respectively. The streaming media encoding scheme may be carried in a data packet used for streaming media transmission. The network device 110 may parse a received data packet, determine a streaming media encoding scheme, and determine, according to the streaming media encoding scheme, a quantity of data packets included in one GOP. In this way, the network device 110 may determine data packets in the T GOPs based on a start location of one GOP (that is, a first data packet in the one GOP) and a quantity of data packets included in the one GOP. For example, if the network device 110 determines that one GOP includes eight data packets and a first data packet in a first GOP is a data packet 1, the network device 110 may determine that the data packet 1 to a data packet 8 may constitute the first GOP, a data packet 9 to a data packet 16 may constitute a second GOP, and so on.

Optionally, in some embodiments, a quantity of GOPs stored in the network device 110 may be set when the network device 110 is delivered from a factory, or may be preset by the user and stored in the network device 110.

Optionally, in some other embodiments, the network device 110 may voluntarily determine a value of T (that is, a quantity of GOPs that can be stored).

For example, in some embodiments, the network device 110 may determine the value of T based on an available space size of a storage apparatus configured to buffer data. For example, if the available space size of the storage apparatus is greater than 0 and less than or equal to a first preset storage space size, the value of T may be 1; or if the available space size of the storage apparatus is greater than the first preset storage space size and is less than or equal to a second preset storage space size, the value of T may be 2; or if the available space size of the storage apparatus is greater than the second preset storage space size and is less than or equal to a third preset storage space size, the value of T may be 3.

For another example, in some embodiments, the network device 110 may determine the value of T based on related information of streaming media. When the streaming media include a video, the related information of the streaming media may include a resolution, a code rate, a frame rate, and the like. When the streaming media include audio, the related information of the streaming media may include a bit rate, a code rate, and the like. For example, if a resolution of the data 1 is 1080P, the value of T may be 4; or if a resolution of the data 1 is 2K, the value of T may be 3; or if a resolution of the data 1 is 4K, the value of T may be 2.

For another example, in some embodiments, the network device 110 may determine the value of T based on server identity information. For example, values of T of streaming media from different servers are different. For example, for streaming media from the server 121 or a server 122, the value of T may be 2. For streaming media from a server other than the server 121 or the server 122, the value of T may be 3.

For another example, in some other embodiments, the network device 110 may determine the value of T with reference to any two or all of an available space size of a storage apparatus, related information of streaming media, and server identity information.

If the service 1 is a non-streaming media service, for example, if the service 1 is a file download service, a maximum quantity of buffered data packets may be set in the network device 110. A quantity of data packets buffered by the network device 110 is less than or equal to the maximum quantity of buffered data packets. A manner of determining the maximum quantity of buffered data packets may be similar to a manner of determining the value of T. Details are not described again herein.

Optionally, in some embodiments, the network device 110 may age the buffered data corresponding to the service 1.

It is assumed that the service 1 is a streaming media service. As described above, the data of the service 1 that is buffered by the network device 110 may constitute the T GOPs. It is assumed that the data corresponding to the service 1 includes a plurality of GOPs, the value of T is 2, and one GOP includes eight data packets. In other words, the data of the service 1 that can be buffered by the network device 110 may constitute two GOPs. For the first two GOPs in the plurality of GOPs sent by the server 121, the network device 110 may directly buffer corresponding data. When receiving a first data packet in a third GOP sent by the server 121, the network device 110 may delete all data packets that constitute the first GOP, and buffer data packets that are used to constitute the third GOP; when receiving a first data packet in a fourth GOP sent by the server 112, the network device 110 may delete all data packets that constitute the second GOP, and buffer data packets that constitute the fourth GOP; and so on.

It is assumed that the service 1 is a non-streaming media service. As described above, if the service 1 is a non-streaming media service, the quantity of data packets buffered by the network device 110 is not greater than the maximum quantity of buffered data packets. For ease of description, $D_{max}$ is used to represent the maximum quantity of buffered data packets below. The network device 110 may directly buffer the first $D_{max}$ data packets of the data 1 that are received from the server 121. In some embodiments, when receiving a $(D_{max}+1)^{th}$ data packet of the data 1 from the server 121, the network device 110 deletes a received first data packet of the data 1, and buffers the $(D_{max}+1)^{th}$ data packet; when receiving a $(D_{max}+2)^{th}$ data packet of the data 1 from the server 121, the network device 110 deletes a received second data packet of the data 1, and buffers the $(D_{max}+2)^{th}$ data packet; and so on.

Optionally, in some embodiments, the network device 110 may include a first storage apparatus and a second storage apparatus. A read/write speed of the first storage apparatus is greater than a read/write speed of the second storage apparatus.

For example, in some embodiments, the first storage apparatus may be a memory of the network device 110. The second storage apparatus may be an external storage apparatus mounted on the network device 110 through an interface. For example, the second storage apparatus may be an external hard disk connected to the network device 110 through a universal serial bus (USB) port.

For another example, in some other embodiments, the first storage apparatus may be a solid-state drive (SSD) with a high-speed interface (for example, a non-volatile memory express (NVMe) interface or a peripheral component interconnect express (PCIe) interface), and the second storage apparatus is a mechanical hard disk with a low-speed interface (for example, a serial advanced technology attachment (SATA) interface).

The network device 110 may select, based on the service type of the service 1, a storage apparatus configured to buffer the data corresponding to the service 1. Based on service real-time performance, a service requested by a terminal device may be classified into a real-time data service (for example, a video-live service or an audio-live service) and a non-real-time data service (for example, a file download service or a video-on-demand service). The real-time data service may also be referred to as a live data service. The real-time data service means that data of the service is obtained in real time. The data of the real-time data service is continuously generated. The data of the real-time data service is not interrupted and a total data volume of the real-time data service continuously increases provided that a data source that provides data for the real-time data service does not interrupt data collection. The non-real-time data service means that data of the service is pre-obtained and stored. Total data of the non-real-time data service is specific and no new data is added. If the service type of the service 1 is a real-time data service, the network device 110 may buffer, through the first storage apparatus, the data corresponding to the service 1; or if the service type of the service 1 is a non-real-time data service, the network device 110 may buffer, through the second storage apparatus, the data corresponding to the service 1.

Optionally, in some embodiments, if the server 121 sends a data feedback corresponding to a data request to the terminal device, the network device 110 may further buffer the data feedback.

Similarly, the network device 110 may also age the data feedback. For example, in some embodiments, if receiving a new data feedback, the network device 110 may delete previous data feedback information. For another example, a timer may be set, and if the timer expires, the network device 110 may delete stored data feedback information.

After receiving the data 1, the terminal device 101 may continue to send a data request to the server 121, to continue to request to obtain the data of the service 1.

Optionally, in some embodiments, the data of the service 1 may further include some necessary data. The network device 110 may buffer the necessary data of the service 1, but does not age the necessary data. The RTMP is used as an example. If the service 1 is a video service and a protocol corresponding to the video service is the RTMP, the data of the service 1 may further include a sequence parameter set (SPS) and a picture parameter set (PPS). The terminal device needs to decode a video based on information in the SPS and the PPS. Therefore, the SPS and the PPS may be considered as necessary data of the service 1. In some cases, the SPS and the PPS may exist only at a start location of a video stream, or exist in some key frames. Therefore, if the data of the service 1 that is received by the terminal device does not include the SPS and the PPS, the terminal device may not correctly decode a video. However, if data of a video service requested by the network device 110 includes the SPS and the PPS only at the start location of the video stream, the network device 110 needs to store the necessary data but may not age the necessary data. If the SPS and the PPS exist in a key frame, but the data of the service that is buffered by the network device 110 is not in a unit of a group of pictures (GOP) (in other words, a quantity of data packets of the data buffered by the network device 110 is less than a quantity of data packets included in one GOP, or the network device 110 does not age the buffered data of the service in a unit of a GOP), the network device further needs to buffer the necessary data and does not age the necessary data. The GOP usually includes the key frame. Therefore, if the data of the video service that is buffered by the network device 110 is not buffered in a unit of a GOP, when aging the buffered data of the video service, the network device 110 may delete a data packet corresponding to a key frame. In other words, in this case, the data of the video service that is buffered by the network device 110 does not include the SPS and the PPS. If other terminal devices request to obtain the data of the video service in this case, the data of the video service that is sent by the network device 110 to these terminal devices does not include the SPS and the PPS. Consequently, these terminal devices cannot correctly decode the data of the video service. Therefore, to ensure that the buffered data of the video service can be correctly decoded, if the data buffered by the network device 110 is not in a unit of a GOP, the network device 110 needs to buffer the key data (that is, the SPS and the PPS) and does not age the key data.

208: The network device 110 receives service requests sent by the terminal device 102, the terminal device 103, a terminal device 104, and a terminal device 105.

Similar to the service request sent by the terminal device 101, the service request sent by each of the terminal device 102 to the terminal device 105 also includes identity information of an object of a service requested to be obtained. The RTMP is still used as an example. The identity information of the object of the service that may be included in the service request sent by each of the terminal device 102 to the terminal device 105 may be a channel name.

Optionally, in some embodiments, before sending the service requests to the server 121 through the network device 110, the terminal device 102 to the terminal device 105 each may first establish a connection to the network device 110. A manner in which the terminal device 102 to the terminal device 105 each establish a connection to the network device 110 is the same as the manner in which the terminal device 101 establishes a connection to the network device 110. Details are not described herein again.

Optionally, in some embodiments, the terminal device 102 to the terminal device 105 each may also establish a connection to the server through the network device 110. An implementation in which the terminal device 102 to the terminal device 105 each establish a connection to the server is the same as the manner in which the terminal device 101 establishes a connection to the server. Details are not described herein again.

209: The network device 110 determines corresponding service-related information based on the received service requests.

For ease of description below, the service request sent by the terminal device 102 is referred to as a service request 2, and the corresponding service-related information is referred to as service-related information 2; the service request sent by the terminal device 103 is referred to as a service request 3, and the corresponding service-related information is referred to as service-related information 3; the service request sent by the terminal device 104 is referred to as a service request 4, and the corresponding service-related information is referred to as service-related information 4; and the service request sent by the terminal device 105 is referred to as a service request 5, and the corresponding service-related information is referred to as service-related information 5.

Similar to the service-related information 1, the service-related information 2 to the service-related information 5 each may include the identity information of the object of the requested service. Optionally, in some embodiments, the service-related information 2 to the service-related information 5 each may further include server identity information. Optionally, in some other embodiments, the service-related information 2 to the service-related information 5 each may further include terminal device identity information.

210: The network device 110 determines whether to buffer data of the service requested by each of the service request 2 to the service request 5.

Optionally, the network device 110 may determine whether the network device 110 stores service-related information that matches the service-related information 2 to the service-related information 5, to determine whether to store the data of the service requested by each of the service request information 2 to the service request information 5. If the network device 110 stores the matched service-related information, the network device 110 may determine that the data of the service requested by each of the service request 2 to the service request 5 is stored; or if the network device 110 does not store the matched service-related information, the network device 110 may determine that the data of the service requested by each of the service request 2 to the service request 5 is not stored.

Optionally, in some embodiments, if two pieces of service-related information have same service object identity information, the two pieces of service-related information match. For example, in some cases, content of objects of a same service provided by different servers may be the same. In this case, it may be considered that two pieces of service-related information match provided that the two pieces of service-related information have same service object identity information.

Optionally, in some other embodiments, if two pieces of service-related information have same service object identity information and same server identity information, the two pieces of service-related information match. In some cases, content of objects of a same service provided by different servers may also be different. For example, two servers provide video-live services for a same channel, but live videos provided by the two servers may have different resolutions. In this case, not only service object identity information needs to be matched, but also server identity information needs to be matched.

It is assumed that the identity information of the object of the service in each of the service-related information 2 to the service-related information 4 is also the channel name 1, and the server identity information is the identity information of the server 121. In other words, the terminal device 102 to the terminal device 104 also request the service 1 from the server 121. It is assumed that the identity information of the object of the service in the service-related information 5 is a channel name 2, the server identity information is the identity information of the server 121, and the channel name 1 and the channel name 2 are different channels. It is assumed that the network device 110 stores only the service-related information 1. In this case, the service-related information 1 matches each of the service-related information 2 to the service-related information 4, and the service-related information 1 does not match the service-related information 5. In other words, the network device 110 stores service-related information that matches the service-related information 2 to the service-related information 4, and the network device 110 does not store service-related information that matches the service-related information 5. In this case, the network device 110 may determine that the data of the service requested by each of the terminal device 102 to the terminal device 104 is buffered, but the data of the service requested by the terminal device 105 is not buffered.

For ease of description, the following steps are further described by using an example in which the terminal device 102 to the terminal device 104 also request the service 1 from the server 121, the terminal device 105 requests a service 2 from the server 121, the service 1 is different from the service 2, and the network device 110 does not buffer data of the service 2.

211: The network device 110 sends the service request 2 to the service request 5 to the server 121.

In step 211, the network device 110 directly sends the received service requests to the server 121. Optionally, in some other embodiments, the network device 110 may alternatively intercept the received service requests. For example, if the service request 2 sent by the terminal device 102 does not include data (for example, a user name and a password) on which verification needs to be performed by the server, the network device 110 may also intercept the service request 2, and sends a feedback for the buffered service request to the terminal device 102.

The HLS is used as an example. The service request (a get message) sent by the terminal device 101 includes the domain name of the server 121 and a name of a playlist of a video that the terminal device 101 requests to play. After receiving the service request, the server 121 may send a corresponding playlist file to the terminal device 101. The network device 110 may buffer the received playlist file. When the service request sent by the terminal device 102 includes a same server domain name and a same playlist name, the network device 110 may intercept the service request, and send the corresponding buffered playlist file to the terminal device 102.

212: The network device 110 receives data requests sent by the terminal device 102, the terminal device 103, the terminal device 104, and the terminal device 105, where the data requests sent by the terminal device 102, the terminal device 103, and the terminal device 104 are used to request the data of the service 1, and the data request of the terminal device 105 is used to request the data of the service 2.

Specific content and forms of the data requests sent by the terminal device 102, the terminal device 103, the terminal device 104, and the terminal device 105 are similar to the specific content and form of the data request sent by the terminal device 101. Details are not described herein again.

213: The network device 110 intercepts the data requests sent by the terminal device 102, the terminal device 103, and the terminal device 104, and sends, to the server 121, the data request sent by the terminal device 105.

As described above, the network device 110 buffers the data of the service 1. However, the network device 110 does not buffer the data of the service 2. Therefore, the network device 110 needs to send the request information 5 to the server 121, to obtain the data of the service 2 from the server 121.

Optionally, in some other embodiments, the network device 110 may intercept only data requests sent by some of the terminal device 102, the terminal device 103, and the terminal device 104. For example, the network device 110 may intercept the data requests sent by the terminal device 102 and the terminal device 103, and send, to the server 121, the data request sent by the terminal device 104. In this case, the network device 110 may further receive the data of the service 1 that is requested by the terminal device 104. The network device 110 may buffer the data of the service 1 that is requested by the terminal device 104. In this way, even if the terminal device 101 is disconnected, the network device 110 may further continue to obtain the data of the service 1 requested by the terminal device 104, buffer the data of the service 1 requested by the terminal device 104, and send the buffered data of the service 1 (that is, the data of the service 1 requested by the terminal device 104) to the terminal device 102 to the terminal device 104. This can avoid service interruption caused when the terminal device 101 is disconnected from the server.

214: The network device 110 sends the buffered data of the service 1 to the terminal device 102 to the terminal device 104.

In other words, because the network device 110 has buffered the data of the service 1 requested by the terminal device 102 to the terminal device 104, the network device 110 does not need to send, to the server 121, the data requests sent by the terminal device 102 to the terminal device 104, but may directly send the buffered data of the service 1 to the terminal device 102 to the terminal device 104. In this case, the server 121 does not send, to the network device 110, the data of the service 1 requested by the terminal device 102 to the terminal device 104. In other words, for the data of the service 1 requested by the terminal device 101 to the terminal device 104, the server 121 sends only the data of the service 1 requested by the terminal device 101 to the network device 110. This can prevent a plurality of pieces of same downlink data from simultaneously occupying a downlink bandwidth. Therefore, a transmission speed of the data of the service 1 also increases, and impact on a transmission speed of data that another terminal device (for example, the terminal device 105) requests to obtain is also reduced.

As described above, in some cases, the data of the service 1 that is buffered by the network device 110 further includes the necessary data of the service 1. When sending the buffered data of the service 1 to the terminal device 102 to the terminal device 104 for the first time, the network device 110 may first send the necessary data to the terminal device 102 to the terminal device 104. For example, if the service 1 is an RTMP-based video-live service, the necessary data may include the SPS and the PPS. The network device 110 first sends the SPS and the PPS of the service 1 to the terminal device 102 to the terminal device 104. In this way, the terminal device 102 to the terminal device 104 can correctly decode a video stream by using the SPS and the PPS.

The network device 110 may maintain service-terminal device relationship information, and determine, based on the service-terminal device relationship information, a terminal device that needs to send a service. For example, the service-terminal device relationship information may be stored in the network device 110 in a form of a table. Each entry in the table indicates information about a relationship between a terminal device and a service requested by the terminal device. Assuming that service-related information includes service identity information and server identity information, each entry in the table may include service-related information and terminal device identity information corresponding to the service-related information. As described above, service-related information is determined by the network device 110 based on a service request sent by a terminal device. The terminal device identity information corresponding to the service-related information is identity information of a terminal device that sends a service request used to determine the service-related information. The terminal device identity information may be an IP address of the terminal device, or may be other information that may be used to identify the terminal device.

Optionally, in some embodiments, the terminal device may not need to obtain all data of a requested service. A live service is used as an example. The terminal device may obtain data generated after a request is initiated, and the terminal device does not need to obtain data generated before the request is initiated. For example, it is assumed that both the terminal device 101 and the terminal device 102 request a video-conference-live service and a same conference, and servers providing a video of the conference are also the same. It is assumed that the terminal device 101 requests a live video of the conference at a moment T1, and the terminal device 102 requests a live video of the conference at a moment T2, where T1 is earlier than T2. The terminal device 102 may only need to obtain a live video of the conference starting from the moment T2, and does not need to obtain a video of the conference between the moment T1 and the moment T2. In this case, the network device 110 may intercept a data request that is sent by the terminal device 102 to request to obtain the conference. For ease of description, a service that does not need to obtain all data of a requested service may be referred to as a non-integrity data service.

Optionally, in some other embodiments, the terminal device needs to obtain all data of a requested service. A download service is used as an example. The terminal device needs to obtain all data packets of a downloaded file. For example, it is assumed that both the terminal device 101 and the terminal device 102 request a video file download service and a same video file, and servers providing the video file are also the same. It is assumed that the terminal device 101 requests to download the video file at a moment T1, the terminal device 102 requests to download the video file at a moment T2, and the terminal device 101 has not completed downloading the video file at the moment T2, where T1 is earlier than T2. In this case, before determining whether to intercept a data request sent by the terminal device 102, the network device 110 further needs to determine whether all data packets from a first data packet to a data packet at the moment T2 that are of the video file have been buffered. It is assumed that the terminal device 101 has obtained 50% data of the video file at the moment T2. The network device 110 needs to first determine whether the 50% data of the video file has been buffered. If the network device 110 buffers the 50% data of the video file, the network device 110 may intercept the data request of the terminal device 102. If the network device 110 buffers only 40% to 50% data of the video file (in other words, the first 40% data of the video file has been aged and deleted), the network device 110 needs to send the data request of the terminal device 102 to the server. For ease of description, a service that needs to obtain all data of a requested service may be referred to as an integrity data service.

Therefore, in some embodiments, before determining whether to intercept a data request sent by a terminal device, the network device 110 may further determine whether a service type of a service is one of an integrity data service and a non-integrity data service. If the type of the service is a non-integrity data service, the data request sent by the terminal device may be intercepted when data corresponding to the service is buffered; or if the type of the service is an integrity data service, it is determined that the data corresponding to the service is buffered, and it is further required to determine that the buffered data corresponding to the service can enable the terminal device to obtain all data of the data corresponding to the service.

In some embodiments, a real-time data service may be a non-integrity data service, and a non-real-time data service is an integrity data service. Therefore, in some embodiments, whether a data request sent by a terminal device can be directly intercepted may be determined only by determining whether a type of a service is a real-time service. In other words, if the type of the service is a real-time data service, the data request sent by the terminal device may be intercepted when data corresponding to the service is buffered; or if the type of the service is a non-real-time data service, it is determined that the data corresponding to the service is buffered, and it is further required to determine that the buffered data corresponding to the service can enable the terminal device to obtain all data of the data corresponding to the service.

In some embodiments, in addition to sending the data requests used to request to obtain data to the server 121, the terminal device 102 to the terminal device 104 may further send some other information. The RTMP is still used as an example. In addition to sending the data request to the server 121, the terminal device may further send a keepalive message (which may also be referred to as a heartbeat packet) or another RTMP extension message. For keepalive messages and RTMP extension messages that are sent by the terminal device 102, the terminal device 103, and the terminal device 104, the network device 110 may directly forward these messages to the server 121. In other words, the network device 110 may not intercept but transparently transmit other messages other than the data request.

The network device 110 may analyze a message received from the terminal device, and determine whether to transparently transmit or directly intercept the message based on content of the message. For example, keywords in messages of different functions may be different. The network device 110 may parse a keyword in a message to determine whether the message is a data request, a service request, a keepalive message, or another message.

A keepalive message is used as an example. If the terminal device 101 to the terminal device 104 send keepalive messages to the server 121 in a process of receiving a data packet, the server 121 may determine that the terminal device 101 to the terminal device 104 are not disconnected from the server 121. If the terminal device 101 to the terminal device 104 do not send keepalive messages to the server 121 in a process of receiving a data packet, the server 121 may not determine whether the terminal device 101 to the terminal device 104 are disconnected from the server 121. In this case, the server 121 may still send data packets to the terminal device 101 to the terminal device 104 when the terminal device 101 to the terminal device 104 are disconnected from the server 121. Consequently, a bandwidth waste is caused. It can be learned that, if the keepalive messages sent by the terminal device 101, the terminal device 102, the terminal device 103, and the terminal device 104 are not transparently transmitted to the server 121, the bandwidth waste may be caused because the server cannot find the disconnection in time.

Optionally, in some embodiments, if the network device 110 determines that the terminal device 101 is disconnected, the network device 110 may release an intercepted data request sent by a terminal device (any one of the terminal device 102 to the terminal device 104). That the terminal device 101 is disconnected may mean that the terminal device 101 is disconnected from the server 121, or may mean that the terminal device 101 is disconnected from the network device 110.

Optionally, in some embodiments, the network device 110 may release only a data request sent by one of a plurality of terminal devices or data requests sent by some of the plurality of terminal devices. For ease of description, a terminal device that sends a data request released by the network device 110 may be referred to as a target terminal device below.

Optionally, in some other embodiments, a target terminal device selected by the network device 110 may be a first terminal device, other than the terminal device 101, that sends a service request used to request the service 1 to the server 121. For example, assuming that the network device 110 sequentially receives the service requests that are sent by the terminal device 102, the terminal device 103, and the terminal device 104 to request the service 1, the network device 110 may release the intercepted data request sent by the terminal device 102. That the network device 110 releases the intercepted data request sent by the terminal device 102 may be understood as that the network device 110 does not intercept data requests received from the terminal device 102, but directly sends the data requests to the server 121. In other words, after the terminal device 101 is disconnected, the network device 110 sends the data request received from the terminal device 102 to the server 121. The server 121 sends the data of the service 1 to the network device 110 based on the data request sent by the terminal device 102. The network device 110 continues to buffer the data of the service 1, and sends the buffered data of the service 1 to the terminal device 102 to the terminal device 104.

Optionally, in some other embodiments, a data request sent by a terminal device may correspond to a time. For example, the data request may carry time information used to indicate the time. The network device 110 may determine, based on a time corresponding to an intercepted data request and a reference time, a to-be-released data request sent by a terminal device. The reference time is a time corresponding to a data request that is sent before the terminal device 101 is disconnected and that is received by a terminal device (for ease of description, a data request whose corresponding time is the reference time is referred to as a reference data request below). The reference data request may be a last data request sent by the terminal device 101 before the terminal device 101 is disconnected, or may be a penultimate data request sent by the terminal device 101 before the terminal device 101 is disconnected, or the like. The network device 110 may select a target data request from the three data requests sent by the terminal device 102, the terminal device 103, and the terminal device 104, and release the target data request. The three data requests are data requests that are sent by the terminal device 102, the terminal device 103, and the terminal device 104 and that are received when the network device 110 receives the reference data request.

Optionally, in some embodiments, a time difference between a time corresponding to the target data request and the reference time is less than a preset threshold, and the time corresponding to the target data request is not later than the reference time.

Optionally, in some other embodiments, a time difference between a time corresponding to the target data request and the reference time is smallest for a time difference between a time corresponding to each of the three data requests and the reference time, and the time corresponding to the target data request is not later than the reference time. In other words, a time difference between the reference time and a time corresponding to each of the other two data requests other than the target data request is greater than the time difference between the time corresponding to the target data request and the reference time.

It is assumed that the target data request is sent by the terminal device 102. In this case, the network device 110 releases the intercepted data request sent by the terminal device 102. That the network device 110 releases the intercepted data request sent by the terminal device 102 may be understood as that the network device 110 does not intercept data requests received from the terminal device 102, but directly sends the data requests to the server 121. In other words, after the terminal device 101 is disconnected, the network device 110 sends, to the server 121, the target data request and the data request that is received from the terminal device 102 after the target data request is received to request the data of the service 1. The server 121 sends the data of the service 1 to the network device 110 based on the data request sent by the terminal device 102. The network device 110 continues to buffer the data of the service 1, and sends the buffered data of the service 1 to the terminal device 102 to the terminal device 104.

The RTMP is used as an example. The data request may include a frame number of a next requested frame. The time information in the data request may be a frame number in the data request. FIG. 3 is a schematic diagram in which the network device 110 receives data requests sent by different terminal devices. FIG. 3 shows frame numbers in the data requests sent by the terminal device 101, the terminal device 102, the terminal device 103, and the terminal device 104. As shown in FIG. 3, after requesting to obtain a data packet of a sixth frame, the terminal device 101 is disconnected from the server. At a same moment, the frame number in the data request sent by the terminal device 102 is the same as the frame number in the data request sent by the terminal device 101, and is earlier than the frame numbers in the data requests sent by the terminal device 103 and the terminal device 104. As shown in FIG. 3, at a moment t5, frame numbers that the terminal device 101 and the terminal device 102 request to obtain are both a fifth frame, and frame numbers that the terminal device 103 and the terminal device 104 request to obtain are a fourth frame. In this case, the network device 110 may release the data request that is sent by the terminal device 102 and whose frame number is 6 and the data request that is sent by the terminal device 102 later. In addition, the network device 110 may continue to intercept the data requests sent by the terminal device 103 and the terminal device 104. In other words, the network device 110 stops intercepting the data request sent by the terminal device 102, and sends, to the server 121, both the data request that is sent by the terminal device 102 and whose frame number is 6 and a data request subsequent to the data request.

As described above, the time corresponding to each of the three data requests sent by the terminal device 102, the terminal device 103, and the terminal device 104 is not later than the reference time. Therefore, assuming that the three data requests are sent to the server 121, the data of the service 1 that is sent by the server 121 and that corresponds to the three data requests overlaps with the data of the service 1 that is requested by the terminal device 101 before the terminal device 101 is disconnected. This cannot cause data transmission interruption when the terminal device 101 is disconnected. FIG. 3 is still used as an example. Although the connection is interrupted after the terminal device 101 requests to obtain the sixth frame, the server 121 still sends the data of the service 1 to the network device 110 based on the data request sent by the terminal device 102. In other words, the server 121 continues to send data packets corresponding to the sixth frame, a seventh frame, and the like to the network device 110 based on the data request sent by the terminal device 102.

Optionally, in some embodiments, the data of the service 1 that is requested by the target data request may and the data of the service 1 that is buffered by the network device 110 may be repeated. FIG. 3 is still used as an example. The server 121 sends the data packet corresponding to the sixth frame to the network device 110 based on the data request sent by the terminal device 102. However, the network device 110 may have buffered the data packet that corresponds to the sixth frame and that is sent by the server 121 to the network device 110 based on the data request of the terminal device 101. In this case, the network device 110 may send only the buffered data packet corresponding to the sixth frame to the terminal device 101 to the terminal device 104, and discard the received repeated data packet corresponding to the sixth frame. In some cases, the network device 110 may simultaneously receive a same data packet sent by the server 121 based on the data request of the terminal device 101 and the data request of the terminal device 102. In this case, the network device 110 may buffer one group of data packets, and discard repeated data packets.

Optionally, in some other embodiments, the time corresponding to the target data request may be a time continuous with the reference time. For example, the reference time corresponds to the fifth frame, and the time corresponding to the target data request may be the sixth frame. This can also be ensured that no data transmission interruption occurs for the service 1.

Figure 4A:
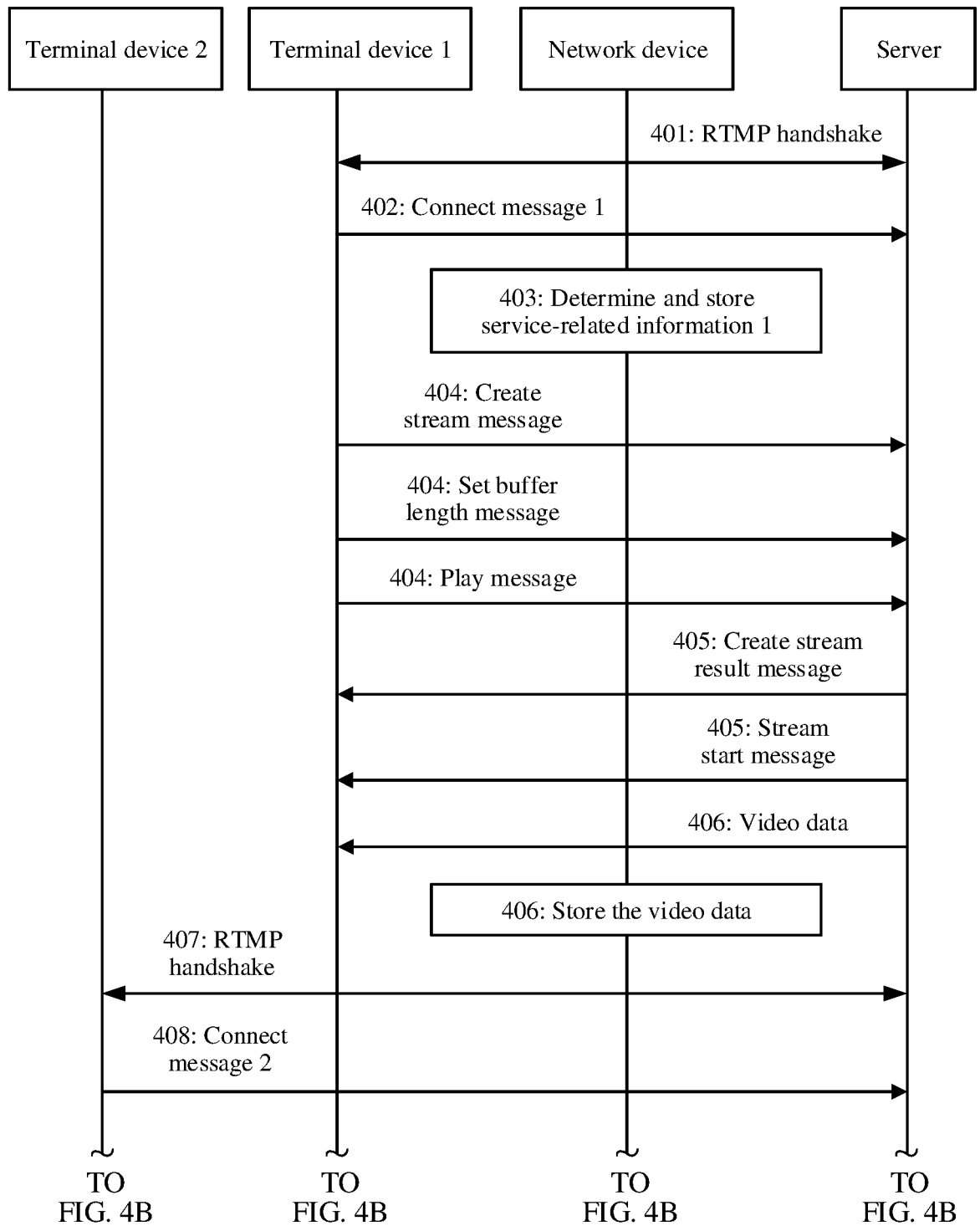
FIG. 4A and FIG. 4B are a schematic flowchart of a data distribution method according to an embodiment of this application.
Figure 4B:
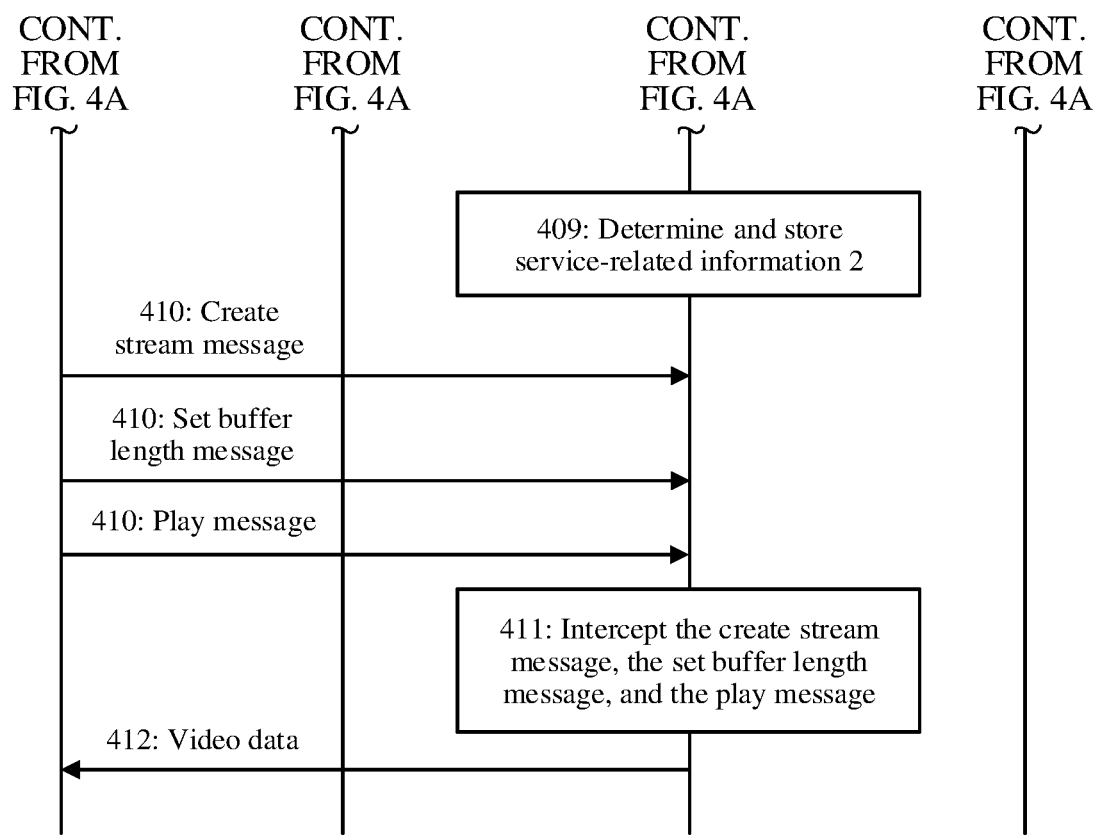

FIG. 4A and FIG. 4B are a schematic flowchart of a data distribution method according to an embodiment of this application. For ease of description, FIG. 4A and FIG. 4B show only a schematic flowchart in which two terminal devices request a same service from a server, and does not show a process in which a terminal device establishes a connection to a network device and a server. The embodiment shown in FIG. 4A and FIG. 4B is described by using an example in which a terminal device 1 and a terminal device 2 request an RTMP-based live video stream from a server, and the terminal device 1 and the terminal device 2 request a same video stream from a same server.

401: The terminal device 1 performs RTMP handshake with the server.

It can be understood that data sent between the terminal device 1 and the server needs to be forwarded through a network device. For ease of description, description of an operation that the network device forwards corresponding data is omitted in a process of describing the method shown in FIG. 4A and FIG. 4B.

402: The terminal device 1 sends a connect message 1 to the server.

The connect message 1 includes a domain name of the server. The connect message 1 may further include a channel name 1 corresponding to the live video stream requested by the terminal device 1.

403: The network device determines service-related information 1 and stores the service-related information 1 based on the connect message 1, where the service-related information 1 includes the channel name 1 and an IP address of the server. The network device may determine the IP address of the server based on the domain name of the server. A correspondence between the domain name of the server and the IP address of the server may be determined based on a packet sent in a process in which the terminal device 1 establishes a connection to the server.

404: The terminal device 1 sends a create stream message, a set buffer length message, and a play message to the server.

405: The server sends a create stream result message and a stream start message to the terminal device 1.

406: The server sends video data to the terminal device 1, where the video data is video data of the video stream requested by the terminal device 1.

It is assumed that the network device does not receive and buffer the video data of the video stream before step 406, and it is assumed that the video stream is data that needs to be buffered. In this case, the network device may buffer the video data of the video stream.

407: The terminal device 2 performs RTMP handshake with the server.

Similarly, data sent between the terminal device 2 and the server needs to be forwarded through the network device.

408: The terminal device 2 sends a connect message 2 to the server.

409: The network device determines service-related information 2 and stores the service-related information 2 based on the connect message 2. It is assumed that the service-related information 2 includes the channel name 1 and the IP address of the server. It can be learned that the channel name and the IP address of the server in the service-related information 2 are the same as the channel name and the IP address of the server in the service-related information 1. Therefore, the network device may determine that data of the service that is requested by the terminal device 2 is buffered.

410: The terminal device 2 sends a create stream message, a set buffer length message, and a play message to the network device.

411: The network device intercepts the create stream message, the set buffer length message, and the play message that are received in step 410. In other words, the network device does not send the message received in step 410 to the server.

412: The network device sends the buffered video data of the video stream to the terminal device 2.

According to the method shown in FIG. 4A and FIG. 4B, when the network device has buffered the video data of the video stream, the network device may directly send the buffered video data of the video stream to the terminal device 2, and intercept the create stream message, the set buffer length message, and the play message that are sent by the terminal device 2. In this case, the server does not need to send, to the network device, the video data of the video stream that has been buffered by the network device, so that a smaller downlink bandwidth can be occupied to transmit data of a same service from the server to the network device.

Figure 5:
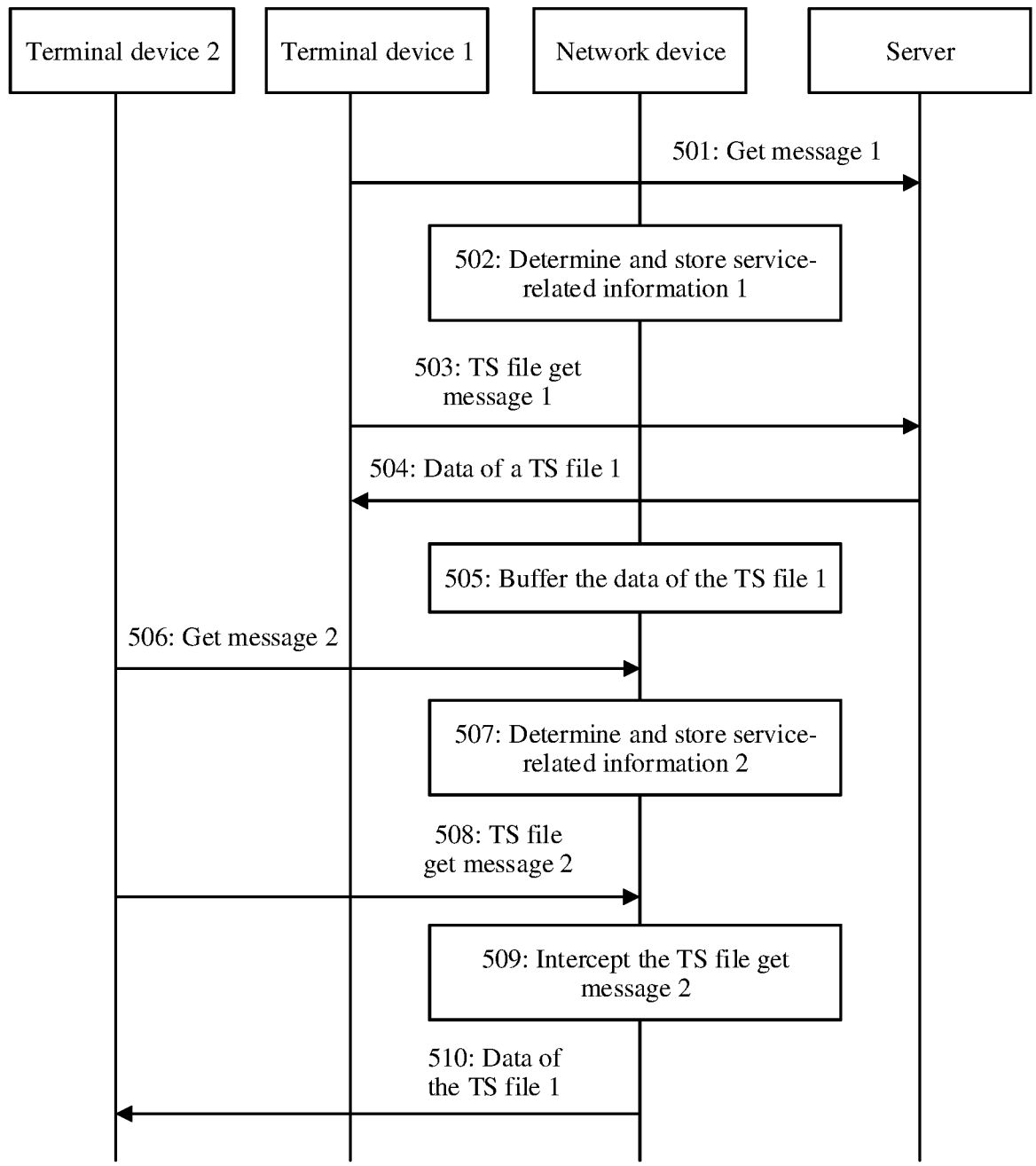
FIG. 5 is a schematic flowchart of a data distribution method according to an embodiment of this application.

FIG. 5 is a schematic flowchart of a data distribution method according to an embodiment of this application. For ease of description, FIG. 5 shows only a schematic flowchart in which two terminal devices request a same service from a server, and does not show a process in which a terminal device establishes a connection to a network device and a server. The embodiment shown in FIG. 5 is described by using an example in which a terminal device 1 and a terminal device 2 request a hypertext transfer protocol based live video stream (HTTP Live Streaming, HLS) from a server, and the terminal device 1 and the terminal device 2 request a same video stream from a same server.

501: The terminal device 1 sends a get message 1 to the server.

It can be understood that data sent between the terminal device 1 and the server needs to be forwarded through a network device. For ease of description, description of an operation that the network device forwards corresponding data is omitted in a process of describing the method shown in FIG. 5. The get message is used to request to obtain a playlist. The server may send the playlist to the terminal device 1. Specifically, the server may send the playlist to the network device, and the network device may forward the received playlist to the terminal device 1.

502: The network device determines service-related information 1 and stores the service-related information 1 based on the get message 1, where the get message 1 includes a file name 1 of the playlist and a domain name of the server. The network device may determine an IP address of the server based on the domain name of the server. A correspondence between the domain name of the server and the IP address of the server may be determined based on a packet sent in a process in which the terminal device 1 establishes a connection to the server.

503: The terminal device 1 sends a transport stream (TS) file get message 1 to the server.

504: The server sends data of a TS file 1 corresponding to the TS file get message 1 to the terminal device 1.

505: The network device buffers the data of the TS file 1.

It is assumed that the network device does not receive and buffer the video data of the video stream before step 505, and it is assumed that the video stream is data that needs to be buffered. In this case, the network device may buffer the video data of the video stream. In addition, the network device may further buffer the playlist sent by the server.

506: The terminal device 2 sends a get message 2 to the network device.

It can be understood that data sent between the terminal device 2 and the server needs to be forwarded through a network device. For ease of description, description of an operation that the network device forwards corresponding data is omitted in a process of describing the method shown in FIG. 5. The get message is used to request to obtain a playlist.

507: The network device determines service-related information 2 and stores the service-related information 2 based on the get message 2, where the get message 2 includes a file name 1 of the playlist and the domain name of the server. The network device may determine the IP address of the server based on the domain name of the server. The correspondence between the domain name of the server and the IP address of the server may be determined based on the packet sent in the process in which the terminal device 1 establishes a connection to the server.

Optionally, in some embodiments, the network device may send the get message 2 received in step 506 to the server, receive the playlist sent by the server to the terminal device 2 based on the get message 2, and forward the playlist to the terminal device 2.

Optionally, in some other embodiments, if the get message 2 received in step 506 does not include a user name and a password and the network device buffers the playlist, the network device may intercept the get message 2 and send the buffered playlist to the terminal device 2.

508: The terminal device 2 sends a TS file get message 2 to the network device.

509: The network device intercepts the TS file get message 2 received in step 508.

510: The network device sends the buffered data of the TS file 1 to the terminal device 2.

According to the method shown in FIG. 5, when the network device has buffered the data of the TS file 1, the network device may directly send the buffered data of the TS file 1 to the terminal device 2, and intercept the TS file get message 2 sent by the terminal device 2. In this case, the server does not need to send, to the network device, the data of the TS file 1 that has been buffered by the network device, so that a smaller downlink bandwidth can be occupied to transmit data of a same service from the server to the network device.

Figure 6:
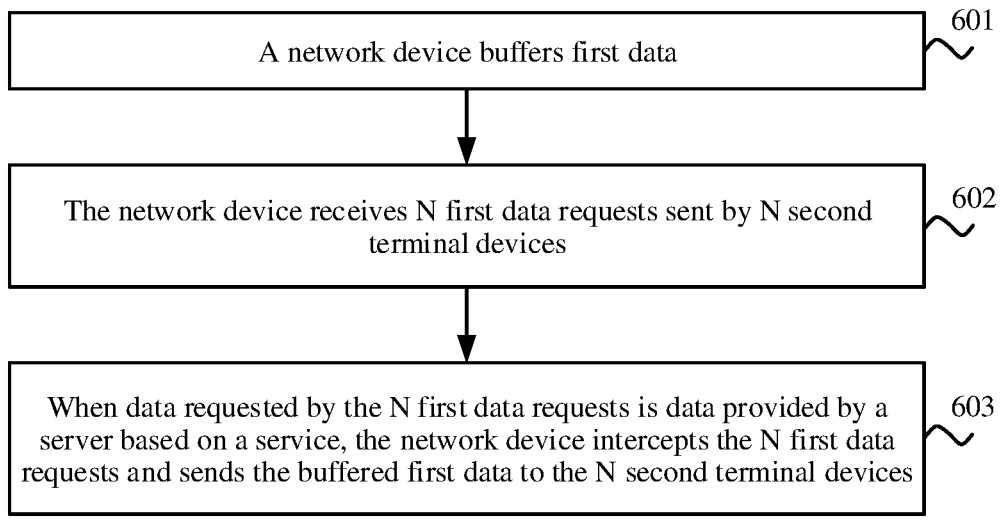
FIG. 6 is a schematic flowchart of a data distribution method according to an embodiment of this application.

FIG. 6 is a schematic flowchart of a data distribution method according to an embodiment of this application.

601: A network device buffers first data, where the first data is data of a service that is provided by a server for a first terminal device.

602: The network device receives N first data requests sent by N second terminal devices, where N is a positive integer greater than or equal to 1.

603: When data requested by the N first data requests is data provided by the server based on the service, the network device intercepts the N first data requests and sends the buffered first data to the N second terminal devices.

Optionally, in some embodiments, the method further includes: The network device receives second data when the first terminal device is disconnected from the server, where the second data is data provided by the server based on the service; the network device buffers the second data; and the network device sends the buffered second data to the N second terminal devices, where the second data is continuous with data received when the first terminal device is disconnected from the server.

That the second data is continuous with data (which is referred to as third data for short below for ease of description) received when the first terminal device is disconnected from the server means that the second data is data of the service that is provided by the server after the server provides the third data for the service. For example, if the second data corresponds to a time and the third data corresponds to a time, the time corresponding to the second data and the time corresponding to the third data are continuous in terms of time, and the time corresponding to the second data is later than the time corresponding to the third data. For another example, if the first terminal device is not disconnected from the server, the server sends the second data after the server sends the third data.

Optionally, in some embodiments, the second data is data of the service that is provided by the server for $N_1$ second terminal devices in the N second terminal devices, where $N_1$ is a positive integer greater than or equal to 1 and less than N; or the second data is data of the service that is provided by the server for M third terminal devices, where M is a positive integer greater than or equal to 1.

Optionally, in some embodiments, before the network device receives the second data, the method further includes: The network device receives N second data requests sent by the N second terminal devices, where data requested by the N second data requests is data provided by the server based on the service, and the data requested by the N pieces of second data is different from the data requested by the N first data requests; and when the first terminal device is disconnected from the server, the network device sends $N_1$ second data requests in the N second data requests to the server, and intercepts $N_2$ second data requests in the N second data requests other than the $N_1$ second data requests. The $N_1$ second data requests are sent by the $N_1$ second terminal devices. In addition, $N_2$ is a positive integer greater than or equal to 1 and less than N, and a sum of $N_1$ and $N_2$ is N.

That the data requested by the N pieces of second data is different from the data requested by the N first data requests may be understood as that content requested by any one of the N second data requests is different from content requested by a corresponding data request in the N first data requests. The corresponding data request is a data request sent by a same terminal device. For example, an $n^{th}$ second terminal device in the N second terminal devices sends an $n^{th}$ second data request in the N second data requests and an $n^{th}$ first data request in the N first data requests, where n=1, ..., or N. Data requested by the $n^{th}$ second data request is different from data requested by the $n^{th}$ first data request. For example, the $n^{th}$ first data request requests a video image of a fourth frame, and the $n^{th}$ second data request requests a video image of a fifth frame. The N second terminal devices send the N second data requests after sending the N first data requests. A time corresponding to each of the N second data requests is later than a time corresponding to a corresponding data request in the N first data requests.

The data of the service that is provided by the server based on the $N_1$ second data requests may be referred to as fourth data. The fourth data may include the second data. For example, the fourth data may include two parts of data: a first part of data and a second part of data. The first part of data may be the same as a part of data in the third data, and the second part of data may be the second data. For another example, all data in the fourth data may be the second data.

Optionally, in some embodiments, each of the N second data requests corresponds to a time, the time corresponding to each of the N second data requests is not later than a reference time, a difference between a time corresponding to each of the $N_1$ second data requests and the reference time is less than a preset threshold, and the reference time is a time corresponding to a last data request that is received by the network device from the first terminal device to request to obtain data of the service.

Optionally, in some embodiments, $N_1$ is equal to 1, each of the N second data requests corresponds to a time, the time corresponding to each of the N second data requests is not later than a reference time, a difference between a time corresponding to the $N_1$ second data request and the reference time is smallest for a difference between the time corresponding to each of the N second data requests and the reference time, and the reference time is a time corresponding to a last data request that is received by the network device from the first terminal device to request to obtain data of the service.

Optionally, in some embodiments, before the network device receives the second data, the method further includes: The network device receives M third data requests sent by the M third terminal devices; and the network device sends the M third data requests to the server when data requested by the M third data requests is data provided by the server based on the service.

The M third terminal devices and the second terminal device request data of a same service. In other words, when receiving data requests sent by a plurality of terminal devices, the network device may intercept data requests sent by only some terminal devices (that is, the N second terminal devices), and does not intercept data requests sent by remaining terminal devices (that is, the M third terminal devices). In this way, data of the service that is provided by the server may be obtained by using a data request that is sent by a terminal device and that is not intercepted.

The data of the service that is provided by the server based on the M third data requests may be referred to as fifth data. The fifth data may include the second data. For example, the fifth data may include two parts of data: a first part of data and a second part of data. The first part of data may be the same as a part of data in the third data, and the second part of data may be the second data. For another example, all data in the fifth data may be the second data.

Optionally, in some embodiments, that a network device buffers first data includes: The network device buffers the first data when data of the service is not buffered.

Optionally, in some embodiments, when the first service is a video service, the first data can constitute at least one group of pictures GOP.

Optionally, in some embodiments, when the first service is a real-time data service, the network device determines to buffer the first data by using a first storage medium; or when the first service is a non-real-time data service, the network device determines to buffer the first data by using a second storage medium, where an access speed of the first storage medium is greater than an access speed of the second storage medium.

Optionally, in some embodiments, the network device in the method shown in FIG. 6 may be the network device 110 in the embodiment shown in FIG. 2A and FIG. 2B, the first terminal device may be the terminal device 101 in the embodiment shown in FIG. 2A and FIG. 2B, and the N second terminal devices may be the terminal device 102 to the terminal device 104 in the embodiment shown in FIG. 2A and FIG. 2B.

Optionally, in some other embodiments, the network device in the method shown in FIG. 6 may be the network device shown in FIG. 4A and FIG. 4B, the first terminal device may be the terminal device 1 in the method shown in FIG. 4A and FIG. 4B, and the second terminal device may be the terminal device 2 in the method shown in FIG. 4A and FIG. 4B.

Optionally, in some other embodiments, the network device in the method shown in FIG. 6 may be the network device shown in FIG. 5, the first terminal device may be the terminal device 1 in the method shown in FIG. 5, and the second terminal device may be the terminal device 2 in the method shown in FIG. 5

For specific functions of the network device, the first terminal device, and the second terminal device in the method shown in FIG. 6, refer to the descriptions in FIG. 2A and FIG. 2B to FIG. 5. Details are not described herein again.

Figure 7:
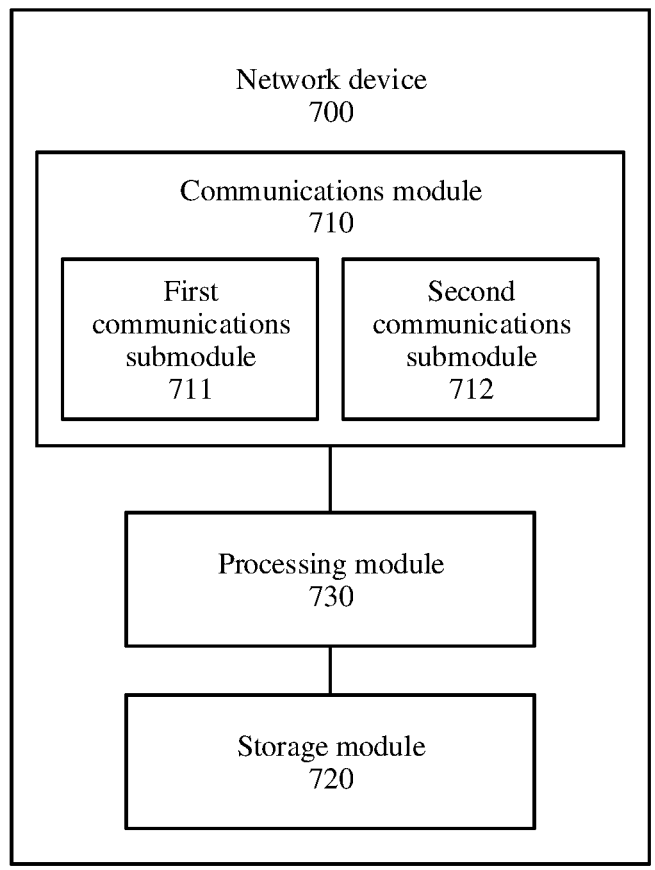
FIG. 7 is a schematic structural diagram of a network device according to an embodiment of this application.

FIG. 7 is a schematic structural diagram of a network device according to an embodiment of this application. As shown in FIG. 7, the network device 700 may include a communications module 710, a storage module 720, and a processing module 730.

The communications module 710 is configured to receive information sent by a terminal device, for example, a data request or a service request.

The communications module 710 is further configured to receive information sent by a server, for example, service data, a data request feedback, or a service request feedback.

The storage module 720 is configured to store data.

The processing module 730 is configured to determine how to process information from the terminal device and information from the network device.

For example, the storage module 720 may be configured to buffer first data, where the first data is data of a service that is provided by the server for a first terminal device.

The communications module 710 may be configured to receive N first data requests sent by N second terminal devices, where N is a positive integer greater than or equal to 1.

The processing module 730 may be configured to intercept the N first data requests when data requested by the N first data requests is data provided by the server based on the service.

The communications module 710 may be further configured to send the first data buffered by the storage module 730 to the N second terminal devices.

Optionally, the communications module 710 may include a first communications submodule 711 and a second communications submodule 712. The first communications submodule 711 is configured to communicate with a terminal device. For example, the first communications submodule 711 may receive a data request or a service request from the terminal device. Information that needs to be sent to the terminal device may also be sent through the first communications submodule 711. For example, service data from the server may be sent to the terminal device through the first communications submodule 711.

Optionally, the processing module 730 may obtain the information that is sent by the terminal device and that is received by the first communications submodule 711. The processing module 730 may parse the received information to determine a manner of processing the information. If it is determined that the received information is a data request and the data request needs to be sent to the server, the data request may be sent to the server through the second communications submodule 712. If it is determined that the received information is a data request and the data request needs to be intercepted, the data request may be directly deleted. If it is determined that the received information is information (for example, a keepalive message or another RTMP extension message) that can be transparently transmitted, the information may be sent to the server through the second communications submodule 712.

For another example, the processing module 730 may obtain information that is sent by the server and that is received by the second communications submodule 712. The processing module 730 may parse the received information to determine a manner of processing the information. If it is determined that the received information includes data of a service requested by a terminal device and it is determined that the data needs to be buffered, the data may be sent to the storage module 720. The storage module 720 may store the received data from the processing module 730. If it is determined that the data is to be sent to the terminal device, the data may be sent to the terminal device through the first communications submodule 711. If it is determined that the received information is information (for example, a service request feedback) that needs to be transparently transmitted to the terminal device, the information may be sent to the terminal device through the first communications submodule 711.

The processing module 730 may further determine whether the data of the service requested by the terminal device needs to be buffered.

The processing module 730 may be further configured to determine a streaming media encoding scheme, and determine, according to the streaming media encoding scheme, a quantity of data packets included in one GOP. The processing module 730 may be further configured to determine a quantity T of buffered groups of pictures.

The processing module 730 may be further configured to determine service-related information corresponding to the service request, and send the service-related information to the storage module 720. The storage module 720 may store the service-related information.

The communications module 710 may be implemented as a transceiver, the storage module 720 may be implemented as a memory, and the processing module 730 may be implemented as a processor. The network device 700 shown in FIG. 7 may perform the steps performed by the network device in the embodiments shown in FIG. 2A and FIG. 2B to FIG. 6.

FIG. 2A and FIG. 2B are used as an example. The communications module 710 may be configured to perform step 201 of receiving the service request 1 sent by the terminal device 101, and may be further configured to perform step 202 of sending the service request 1 to the server 121. The processing module 730 may be configured to perform step 203 of determining the service-related information corresponding to the service request 1. The processing module 730 may be further configured to perform step 204 of determining to buffer the data of the service 1. The communications module 710 may be further configured to perform step 205 of receiving the data request 1 sent by the terminal device 101 and sending the data request 1 to the server 121. The communications module 710 may be further configured to perform step 206 of receiving the data 1 sent by the server and sending the data 1 to the terminal device 101. The storage module 720 may be configured to perform step 207 of buffering the data 1. The communications module 710 may be further configured to perform step 208 of receiving the service requests sent by the terminal device 102, the terminal device 103, the terminal device 104, and the terminal device 105. The processing module 730 may be further configured to perform step 209 of determining the corresponding service-related information based on the received service requests sent by the terminal device 102, the terminal device 103, the terminal device 104, and the terminal device 105. The processing module 730 may be further configured to perform step 210 of determining whether to buffer the service data requested by the service request 2 to the service request 5. The communications module 710 may be further configured to perform step 211 of sending the service request 2 to the service request 5 to the server 121. The communications module 710 may be further configured to perform step 212 of receiving the data requests sent by the terminal device 102, the terminal device 103, the terminal device 104, and the terminal device 105. The processing module 730 may be further configured to perform step 213 of determining to intercept the data requests sent by the terminal device 102, the terminal device 103, and the terminal device 104. The communications module 710 may be configured to perform step 213 of sending, to the server 121, the data request sent by the terminal device 105. The communications module 710 may be further configured to perform step 214 of sending the buffered data of the service 1 to the terminal device 102 to the terminal device 104.

For specific functions and beneficial effects of the communications module 710, the storage module 720, and the processing module 730, refer to the method embodiments shown in FIG. 2A and FIG. 2B to FIG. 6. Details are not described herein again.

Figure 8:
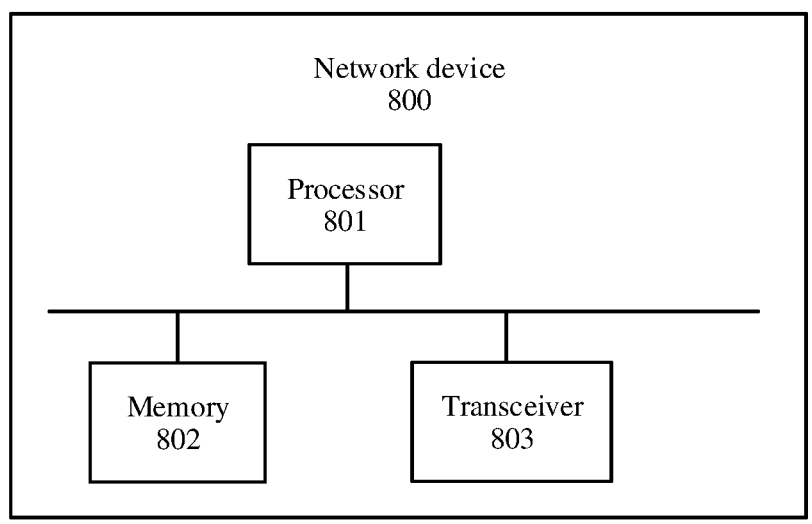
FIG. 8 is a structural block diagram of a network device according to an embodiment of this application.

FIG. 8 is a structural block diagram of a network device according to an embodiment of this application. As shown in FIG. 8, the network device 800 includes a processor 801 and a memory 802. The processor 801 may be configured to: process a communication protocol and communication data, control the network device 800, execute a software program, process data of the software program, and the like. The memory 802 is mainly configured to store a software program and data.

For ease of description, FIG. 8 shows only one memory and only one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit having receiving and sending functions may be considered as a transceiver 803 of the network device 800. Optionally, a component that is in the transceiver 803 and that is configured to implement a receiving function may be considered as a receiving unit, and a component that is in the transceiver 803 and that is configured to implement a sending function may be considered as a sending unit. In other words, the transceiver 803 includes the receiving unit and the sending unit. The receiving unit sometimes may also be referred to as a receiver machine, a receiver, a receiving circuit, or the like. The sending unit sometimes may also be referred to as a transmitter machine, a transmitter, a transmitter circuit, or the like.

The processor 801, the memory 802, and the transceiver 803 communicate with each other through an internal connection path, to transfer a control and/or data signal.

The methods disclosed in the embodiments of this application may be applied to the processor 801 or may be implemented by the processor 801. The processor 801 may be an integrated circuit chip, and has a signal processing capability. In an implementation process, the steps in the foregoing methods can be implemented by using a hardware integrated logic circuit in the processor 801, or by using instructions in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The method, steps, and logical block diagrams that are disclosed in the embodiments of this application may be implemented or performed. The general purpose processor may be a microprocessor, or the processor may be any conventional processor or the like. The steps of the method disclosed with reference to the embodiments of this application may be directly performed and completed by using a hardware decoding processor, or may be performed and completed by using a combination of hardware in a decoding processor and a software module. The software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions in the memory and completes the steps of the foregoing methods in combination with hardware in the processor.

Optionally, in some embodiments, the memory 802 may store instructions used to perform the methods performed by the network device in any one of the methods shown in FIG. 2A and FIG. 2B to FIG. 6. The processor 801 may execute the instructions stored in the memory 802, and complete, in combination with other hardware (for example, the memory 802 and the transceiver 803), the steps performed by the terminal in the methods shown in FIG. 2A and FIG. 2B to FIG. 6.

For example, the memory 802 may be configured to buffer first data, where the first data is data of a service that is provided by a server for a first terminal device.

The transceiver 803 may be configured to receive N first data requests sent by N second terminal devices, where N is a positive integer greater than or equal to 1.

The processor 801 may be configured to intercept the N first data requests when data requested by the N first data requests is data provided by the server based on the service.

The transceiver 803 may be further configured to send the first data buffered by the memory 802 to the N second terminal devices.

FIG. 2A and FIG. 2B are used as an example. The transceiver 803 may be configured to perform step 201 of receiving the service request 1 sent by the terminal device 101, and may be further configured to perform step 202 of sending the service request 1 to the server 121. The processor 801 may be configured to perform step 203 of determining the service-related information corresponding to the service request 1. The processor 801 may be further configured to perform step 204 of determining to buffer the data of the service 1. The transceiver 803 may be further configured to perform step 205 of receiving the data request 1 sent by the terminal device 101 and sending the data request 1 to the server 121. The transceiver 803 may be further configured to perform step 206 of receiving the data 1 sent by the server and sending the data 1 to the terminal device 101. The memory 802 may be configured to perform step 207 of buffering the data 1. The transceiver 803 may be further configured to perform step 208 of receiving the service requests sent by the terminal device 102, the terminal device 103, the terminal device 104, and the terminal device 105. The processor 801 may be further configured to perform step 209 of determining the corresponding service-related information based on the received service requests sent by the terminal device 102, the terminal device 103, the terminal device 104, and the terminal device 105. The processor 801 may be further configured to perform step 210 of determining whether to buffer the service data requested by the service request 2 to the service request 5. The transceiver 803 may be further configured to perform step 211 of sending the service request 2 to the service request 5 to the server 121. The transceiver 803 may be further configured to perform step 212 of receiving the data requests sent by the terminal device 102, the terminal device 103, the terminal device 104, and the terminal device 105. The processor 801 may be further configured to perform step 213 of determining to intercept the data requests sent by the terminal device 102, the terminal device 103, and the terminal device 104. The transceiver 803 may be configured to perform step 213 of sending, to the server 121, the data request sent by the terminal device 105. The transceiver 803 may be further configured to perform step 214 of sending the buffered data of the service 1 to the terminal device 102 to the terminal device 104.

For detailed working processes and beneficial effects of the processor 801, the memory 802, and the transceiver 803, refer to the descriptions in the embodiments shown in FIG. 2A and FIG. 2B to FIG. 6.

An embodiment of this application further provides a chip. The chip includes a transceiver unit and a processing unit. The transceiver unit may be an input/output circuit or a communications interface. The processing unit is a processor, a microprocessor, or an integrated circuit that is integrated on the chip. The chip may perform a method on a network device side in the foregoing method embodiments.

An embodiment of this application further provides a computer-readable storage medium. The computer-readable storage medium stores instructions, and when the instructions are executed, a method on a network device side in the foregoing method embodiment is performed.

An embodiment of this application further provides a computer program product including instructions, and when the instructions are executed, a method on a network device side in the foregoing method embodiment is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiments described above are only examples. For example, division into the units is only logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data distribution method, wherein the method comprises:
    buffering, by a network device, first data, wherein the first data is data of a service that is provided by a server for a first terminal device;
    receiving, by the network device, N first data request(s) sent by N second terminal device(s), wherein N is a positive integer greater than or equal to 1;
    when data requested by the N first data request(s) is data provided by the server based on the service, intercepting, by the network device, the N first data request(s) and sending the buffered first data to the N second terminal device(s);
    receiving, by the network device, second data when the first terminal device is disconnected from the server, wherein the second data is data provided by the server based on the service;
    buffering, by the network device, the second data;
    sending the buffered second data to the N second terminal device(s), wherein the second data is continuous with data received when the first terminal device is disconnected from the server;
    before the receiving, by the network device, of the second data, the method further comprises:
    receiving, by the network device, N second data requests sent by the N second terminal devices, wherein data requested by the N second data requests is data provided by the server based on the service, and the data requested by N second data requests is different from the data requested by the N first data requests; and
    when the first terminal device is disconnected from the server, sending, by the network device, $N_1$ second data requests in the N second data requests to the server such that the $N_1$ second data requests in the N second data requests are not intercepted, and intercepting $N_2$ second data requests in the N second data requests other than the $N_1$ second data requests;
    wherein $N_1$ is a positive integer greater than or equal to 1 and less than N, $N_2$ is a positive integer greater than or equal to 1 and less than N, and wherein N is a positive integer greater than or equal to 2; and
    wherein each of the N second data requests corresponds to a time, the time corresponding to each of the N second data requests is not later than a reference time, a difference between the time corresponding to each of the $N_1$ second data requests in the N second data requests and the reference time is less than a preset threshold.

2. The method of claim 1, wherein the reference time is another time corresponding to a last data request that is received by the network device from the first terminal device to request to obtain data of the service.

3. A data distribution method, wherein the method comprises:
  buffering, by a network device, first data, wherein the first data is data of a service that is provided by a server for a first terminal device;
  receiving, by the network device, N first data request(s) sent by N second terminal device(s), wherein N is a positive integer greater than or equal to 1;
  when data requested by the N first data request(s) is data provided by the server based on the service, intercepting, by the network device, the N first data request(s) and sending the buffered first data to the N second terminal device(s);
  receiving, by the network device, second data when the first terminal device is disconnected from the server, wherein the second data is data provided by the server based on the service;
  buffering, by the network device, the second data;
  sending the buffered second data to the N second terminal device(s), wherein the second data is continuous with data received when the first terminal device is disconnected from the server;
  before the receiving, by the network device, of the second data, the method further comprises:
  receiving, by the network device, N second data requests sent by the N second terminal devices, wherein data requested by the N second data requests is data provided by the server based on the service, and the data requested by N second data requests is different from the data requested by the N first data requests; and
  when the first terminal device is disconnected from the server, sending, by the network device, $N_1$ second data requests in the N second data requests to the server such that the $N_1$ second data requests in the N second data requests are not intercepted, and intercepting $N_2$ second data requests in the N second data requests other than the $N_1$ second data requests;
  wherein $N_1$ is a positive integer greater than or equal to 1 and less than N, $N_2$ is a positive integer greater than or equal to 1 and less than N, and wherein N is a positive integer greater than or equal to 2; and
  wherein $N_1$ is equal to 1, each of the N second data requests corresponds to a time, the time corresponding to each of the N second data requests is not later than a reference time, a difference between the time corresponding to the $N_1$ second data request in the N second data requests and the reference time is smallest for a difference between the time corresponding to each of the N second data requests and the reference time.

4. The method of claim 3, wherein the reference time is another time corresponding to a last data request that is received by the network device from the first terminal device to request to obtain data of the service.

5. A network device, wherein the network device comprises a processor and a memory; the memory is configured to store a computer execution instruction, and when the network device runs, the processor executes the computer execution instruction stored in the memory to:
  buffer first data, wherein the first data is data of a service that is provided by a server for a first terminal device;
  intercept, when data requested by the N first data request(s) is data provided by the server based on the service, the N first data request(s) and send the buffered first data to the N second terminal device(s);
  receive second data when the first terminal device is disconnected from the server, wherein the second data is data provided by the server based on the service;
  buffer the second data;
  send the buffered second data to the N second terminal device(s), wherein the second data is continuous with data received when the first terminal device is disconnected from the server;
  receive N second data requests sent by the N second terminal devices, wherein data requested by the N second data requests is data provided by the server based on the service, and the data requested by N second data requests is different from the data requested by the N first data requests; and
  when the first terminal device is disconnected from the server, send, by the network device, $N_1$ second data requests in the N second data requests to the server such that the $N_1$ second data requests in the N second data requests are not intercepted, and intercept $N_2$ second data requests in the N second data requests other than the $N_1$ second data requests;
  wherein $N_1$ is a positive integer greater than or equal to 1 and less than N, $N_2$ is a positive integer greater than or equal to 1 and less than N, and wherein N is a positive integer greater than or equal to 2;
  wherein each of the N second data requests corresponds to a time, the time corresponding to each of the N second data requests is not later than a reference time, a difference between the time corresponding to each of the $N_1$ second data requests in the N second data requests and the reference time is less than a preset threshold.

6. The network device of claim 5, wherein the reference time is another time corresponding to a last data request that is received by the network device from the first terminal device to request to obtain data of the service.

7. A network device, wherein the network device comprises a processor and a memory; the memory is configured to store a computer execution instruction, and when the network device runs, the processor executes the computer execution instruction stored in the memory to:
  buffer first data, wherein the first data is data of a service that is provided by a server for a first terminal device;
  intercept, when data requested by the N first data request(s) is data provided by the server based on the service, the N first data request(s) and send the buffered first data to the N second terminal device(s);
  receive second data when the first terminal device is disconnected from the server, wherein the second data is data provided by the server based on the service;
  buffer the second data;
  send the buffered second data to the N second terminal device(s), wherein the second data is continuous with data received when the first terminal device is disconnected from the server;
  receive N second data requests sent by the N second terminal devices, wherein data requested by the N second data requests is data provided by the server based on the service, and the data requested by N second data requests is different from the data requested by the N first data requests; and
  when the first terminal device is disconnected from the server, send, by the network device, $N_1$ second data requests in the N second data requests to the server such that the $N_1$ second data requests in the N second data requests are not intercepted, and intercept $N_2$ second data requests in the N second data requests other than the $N_1$ second data requests;

wherein $N_1$ is a positive integer greater than or equal to 1 and less than N, $N_2$ is a positive integer greater than or equal to 1 and less than N, and wherein N is a positive integer greater than or equal to 2; and wherein $N_1$ is equal to 1, each of the N second data requests corresponds to a time, the time corresponding to each of the N second data requests is not later than a reference time, a difference between the time corresponding to the $N_1$ second data request in the N second data requests and the reference time is smallest for a difference between the time corresponding to each of the N second data requests and the reference time.

8. The network device of claim 7, wherein and the reference time is another time corresponding to a last data request that is received by the network device from the first terminal device to request to obtain data of the service.

9. A data distribution method, wherein the method comprises:

buffering, by a network device, first data, wherein the first data is data of a service that is provided by a server for a first terminal device;

receiving, by the network device, N first data request(s) sent by N second terminal device(s), wherein N is a positive integer greater than or equal to 1;

when data requested by the N first data request(s) is data provided by the server based on the service, intercepting, by the network device, the N first data request(s) and sending the buffered first data to the N second terminal device(s);

receiving, by the network device, second data when the first terminal device is disconnected from the server, wherein the second data is data provided by the server based on the service;

buffering, by the network device, the second data;

sending the buffered second data to the N second terminal device(s), wherein the second data is continuous with data received when the first terminal device is disconnected from the server;

before the receiving, by the network device, of the second data, the method further comprises:

receiving, by the network device, N second data requests sent by the N second terminal devices, wherein data requested by the N second data requests is data provided by the server based on the service, and the data requested by N second data requests is different from the data requested by the N first data requests; and when the first terminal device is disconnected from the server, sending, by the network device, $N_1$ second data requests in the N second data requests to the server such that the $N_1$ second data requests in the N second data requests are not intercepted, and intercepting $N_2$ second data requests in the N second data requests other than the $N_1$ second data requests;

wherein $N_1$ is a positive integer greater than or equal to 1 and less than N, $N_2$ is a positive integer greater than or equal to 1 and less than N, and wherein N is a positive integer greater than or equal to 2; and wherein the $N_1$ second data requests are selected from among the N second data requests as target data requests for sending to the server based on a reference time which is a time corresponding to a last data request that is received by the network device from the first terminal device to request to obtain data of the service.

10. A network device, wherein the network device comprises a processor and a memory; the memory is configured to store a computer execution instruction, and when the network device runs, the processor executes the computer execution instruction stored in the memory to:

buffer first data, wherein the first data is data of a service that is provided by a server for a first terminal device;

intercept, when data requested by the N first data request(s) is data provided by the server based on the service, the N first data request(s) and send the buffered first data to the N second terminal device(s);

receive second data when the first terminal device is disconnected from the server, wherein the second data is data provided by the server based on the service;

buffer the second data;

send the buffered second data to the N second terminal device(s), wherein the second data is continuous with data received when the first terminal device is disconnected from the server;

receive N second data requests sent by the N second terminal devices, wherein data requested by the N second data requests is data provided by the server based on the service, and the data requested by N second data requests is different from the data requested by the N first data requests; and when the first terminal device is disconnected from the server, send, by the network device, $N_1$ second data requests in the N second data requests to the server such that the $N_1$ second data requests in the N second data requests are not intercepted, and intercept $N_2$ second data requests in the N second data requests other than the $N_1$ second data requests;

wherein $N_1$ is a positive integer greater than or equal to 1 and less than N, $N_2$ is a positive integer greater than or equal to 1 and less than N, and wherein N is a positive integer greater than or equal to 2; and wherein the $N_1$ second data requests are selected from among the N second data requests as target data requests for sending to the server based on a reference time which is a time corresponding to a last data request that is received by the network device from the first terminal device to request to obtain data of the service.

* * * * *